(12) United States Patent
Koga et al.

(10) Patent No.: US 11,411,476 B2
(45) Date of Patent: Aug. 9, 2022

(54) METHOD OF MANUFACTURING ARMATURE

(71) Applicant: AISIN CORPORATION, Kariya-shi (JP)

(72) Inventors: Kiyotaka Koga, Nishio (JP); Tomotsugu Sugihara, Okazaki (JP)

(73) Assignee: AISIN CORPORATION, Kariya (JP)

( * ) Notice: Subject to any disclaimer, the term of this patent is extended or adjusted under 35 U.S.C. 154(b) by 50 days.

(21) Appl. No.: 16/768,763

(22) PCT Filed: Nov. 30, 2018

(86) PCT No.: PCT/JP2018/044286
§ 371 (c)(1),
(2) Date: Jun. 1, 2020

(87) PCT Pub. No.: WO2019/146257
PCT Pub. Date: Aug. 1, 2019

(65) Prior Publication Data
US 2021/0194335 A1    Jun. 24, 2021

(30) Foreign Application Priority Data

Jan. 29, 2018  (JP) .............................. JP2018-012887

(51) Int. Cl.
*H02K 15/00*  (2006.01)
(52) U.S. Cl.
CPC .... *H02K 15/0081* (2013.01); *Y10T 29/49009* (2015.01)
(58) Field of Classification Search
CPC .... H02K 3/12; H02K 15/0068; H02K 15/085; H02K 15/0414; H02K 3/48; Y10T 29/49012; Y10T 29/49073; Y10T 29/49009; Y10T 29/53143
USPC .... 29/596, 597, 598, 603.03, 606, 732, 843, 29/850, 871
See application file for complete search history.

(56) References Cited

U.S. PATENT DOCUMENTS

| 5,643,669 A | 7/1997 | Tsuei |
| 5,783,303 A | 7/1998 | Tsuei |
(Continued)

FOREIGN PATENT DOCUMENTS

| JP | 2000-15161 A | 1/2000 |
| JP | 2000-506558 A | 5/2000 |
(Continued)

OTHER PUBLICATIONS

Dec. 17, 2020 Search Report issued in European Patent Application No. 18902286.6.
(Continued)

*Primary Examiner* — Thiem D Phan
(74) *Attorney, Agent, or Firm* — Oliff PLC

(57) ABSTRACT

A method of manufacturing an armature includes: a step of placing a bonding agent on bonding surfaces of the distal ends of a plurality of segment conductors; a step of placing the plurality of segment conductors on an armature core; a step of bonding the distal ends to each other; and a step of increasing a viscosity of the bonding agent placed on the distal ends, after the step of placing the bonding agent on the distal ends, and before the step of bonding the distal ends to each other.

10 Claims, 13 Drawing Sheets

(56) References Cited

U.S. PATENT DOCUMENTS

| | | | |
|---|---|---|---|
| 7,262,511 B2* | 8/2007 | Osako | H01L 24/29 |
| | | | 252/512 |
| 10,250,093 B2* | 4/2019 | Hattori | H02K 3/48 |
| 2009/0096313 A1 | 4/2009 | Harada et al. | |
| 2016/0172919 A1 | 6/2016 | Hattori | |
| 2017/0040859 A1 | 2/2017 | Langlard | |

FOREIGN PATENT DOCUMENTS

| | | |
|---|---|---|
| JP | 2006-158044 A | 6/2006 |
| JP | 2015-23771 A | 2/2015 |
| JP | 2015-082868 A | 4/2015 |
| WO | 2015/011542 A2 | 1/2015 |

OTHER PUBLICATIONS

Feb. 12, 2019 Search Report issued in International Patent Application No. PCT/JP2018/044286.

* cited by examiner

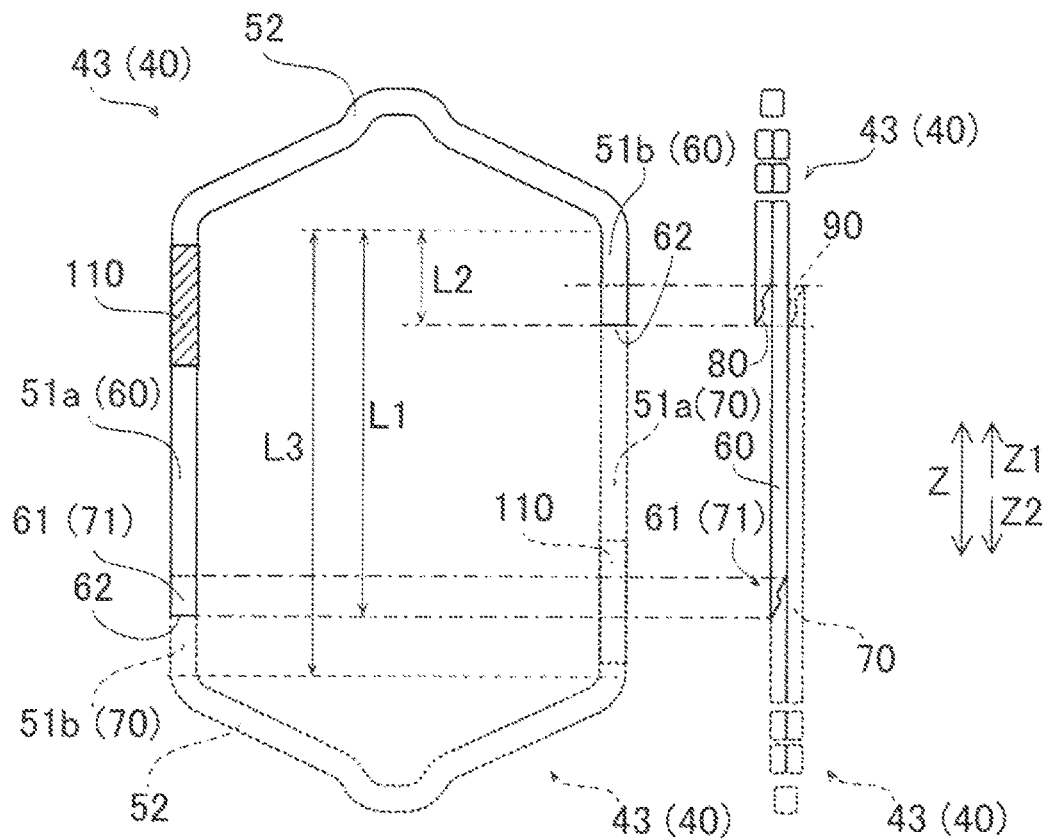
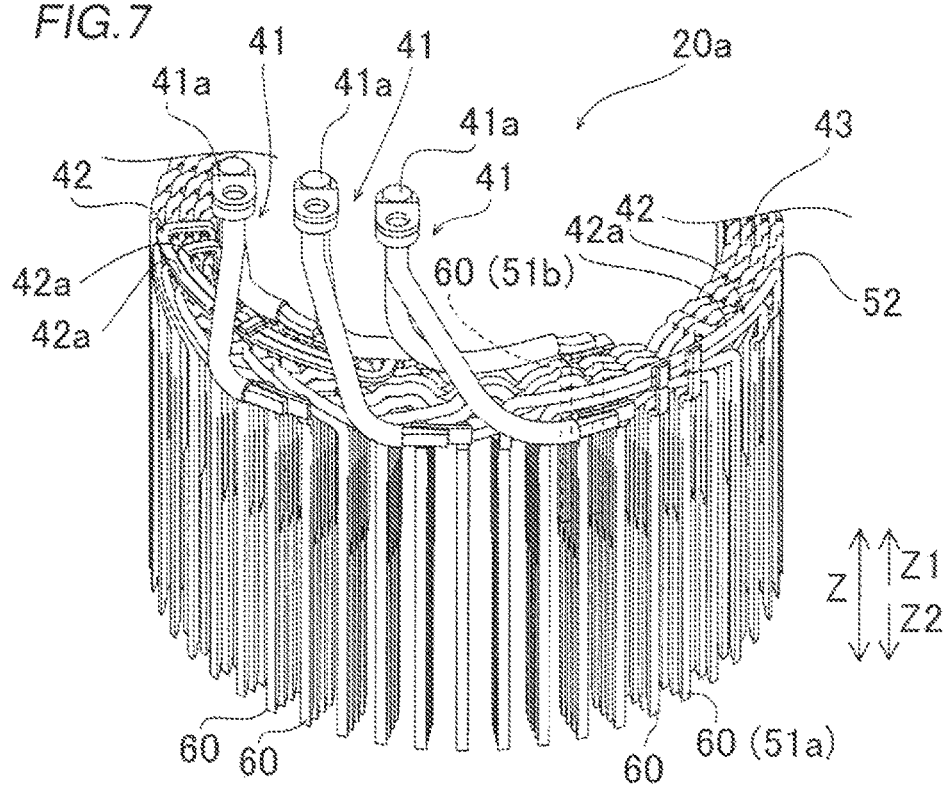

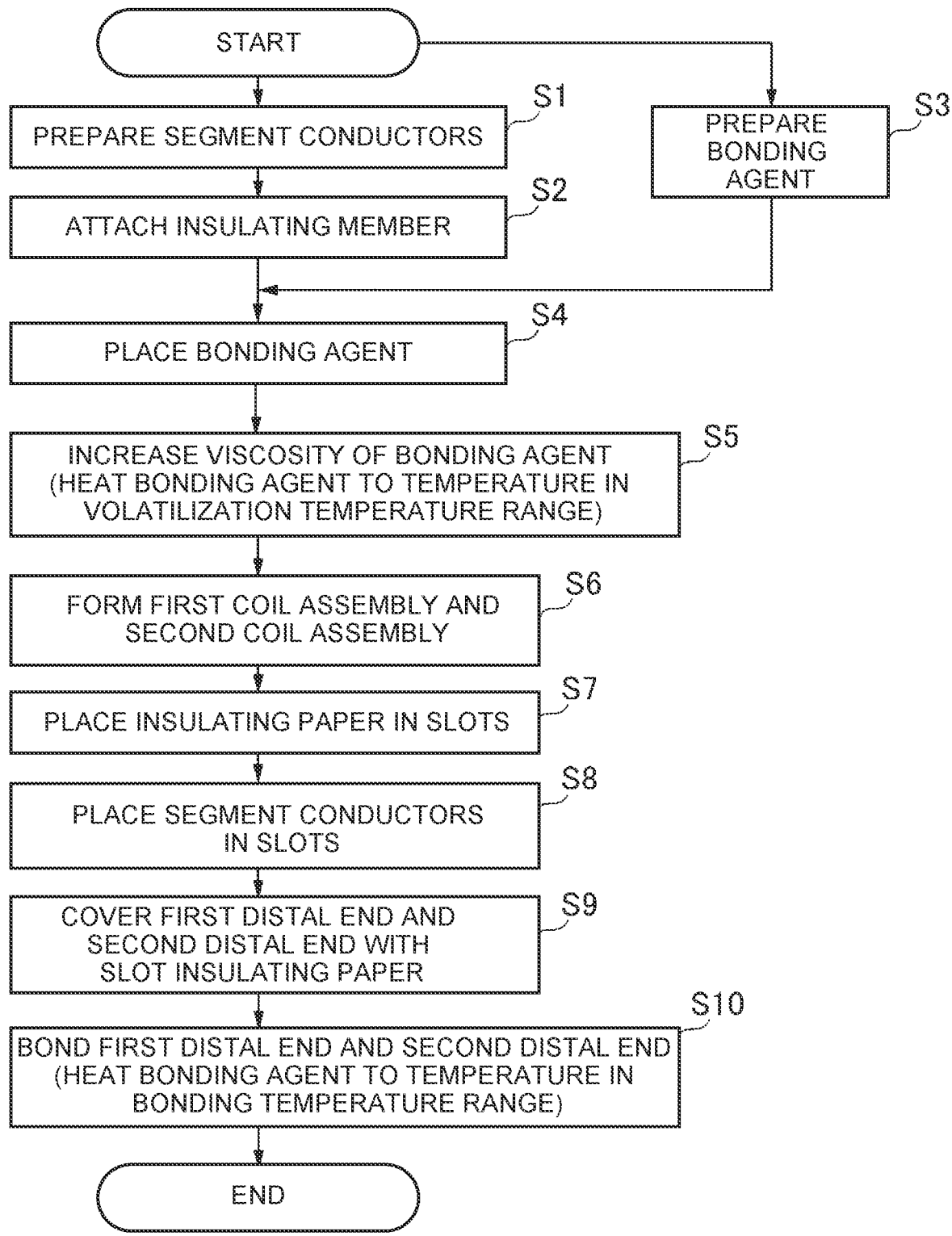

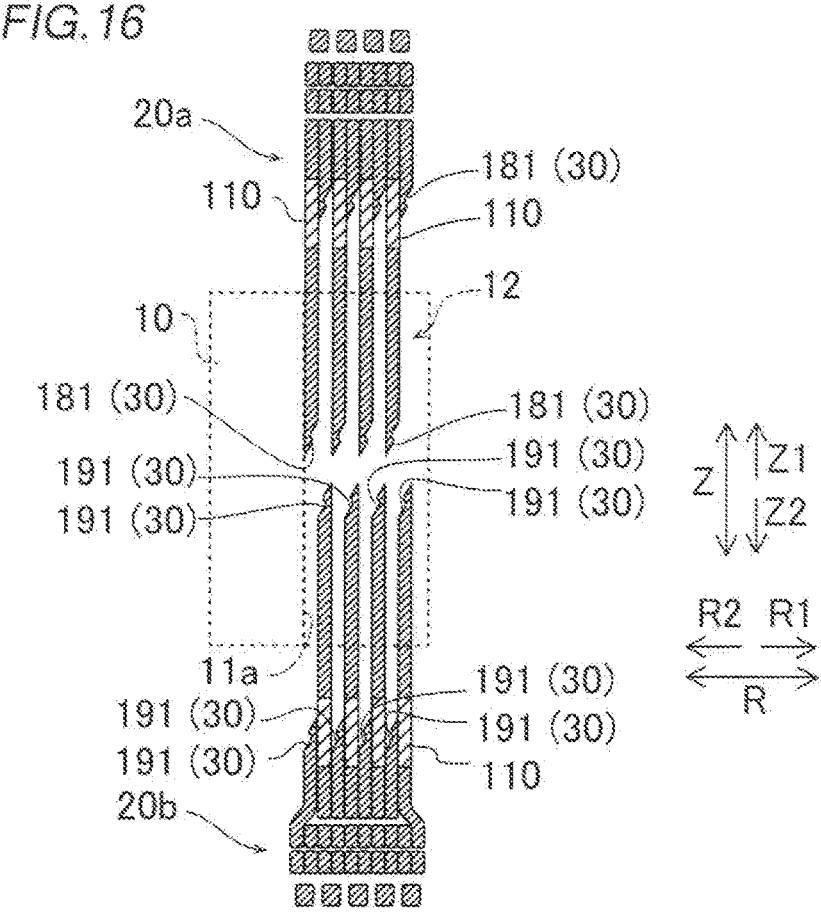
FIG. 16
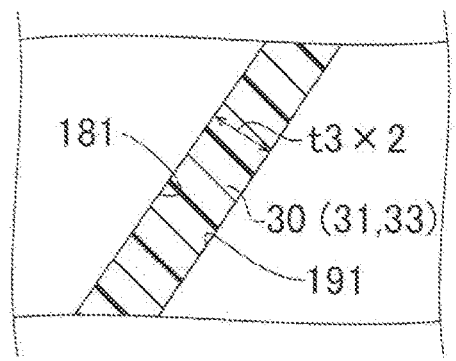
FIG. 17A
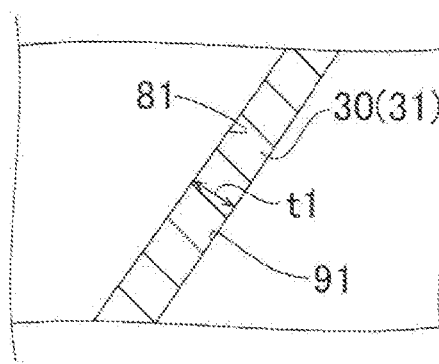
FIG. 17B
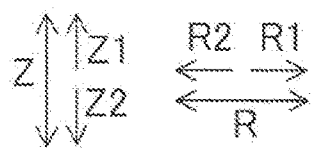
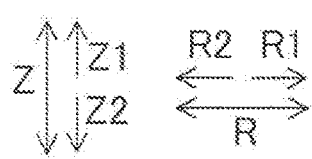

METHOD OF MANUFACTURING ARMATURE

TECHNICAL FIELD

The preferred embodiment relates to a method of manufacturing an armature.

BACKGROUND ART

There is known a method of manufacturing an armature that includes an armature core having a plurality of slots extending in the central axis direction. A method of manufacturing an armature of this type is disclosed in, for example, Japanese Unexamined Patent Application Publication No. 2015-23771 (JP 2015-23771 A).

JP 2015-23771 A discloses a method of manufacturing a rotary electric machine stator (hereinafter referred to as a "stator") that includes a stator core having a plurality of slots extending in the axial direction. According to this stator manufacturing method, a pasty binder containing conductive particles is applied to either one of a distal end of a leg of a one-side conductor segment disposed on one axial side of the stator core and a distal end of a leg of an other-side conductor segment on the other axial side of the stator core. After that, the leg of the one-side conductor segment and the leg of the other-side conductor segment are brought into contact with each other, and pressure and heat are applied thereto. As a result, the binder is cured, so that the legs are bonded to each other in the slot.

RELATED ART DOCUMENTS

Patent Documents

Patent Document 1: Japanese Unexamined Patent Application Publication No. 2015-23771 (JP 2015-23771 A)

SUMMARY OF THE INVENTION

Problem to be Solved by the Invention

However, according to the stator disclosed in JP 2015-23771 A, after the pasty (liquid) binder is applied, the leg of the one-side conductor segment and the leg of the other-side conductor segment are brought into contact with each other, and a pressure is applied thereto. Therefore, after the pasty binder is applied, the pasty binder may move (may drip) from the desired arrangement position on the leg, or the pasty binder disposed between the legs may flow out of the region between the legs before the legs are bonded to each other. As a result, due to the movement of the binder from the desired arrangement position or the flowing of the binder out of the region between the legs, the amount of binder remaining between the legs after the legs are bonded to each other is less than the desired amount. Therefore, the bonding strength (fixing force) is reduced, resulting in a reduction in bonding quality. Accordingly, with the related-art stator (armature) disclosed in JP 2015-23771 A, it is not easy to secure the bonding quality between the legs (distal ends) of the conductor segments (segment conductors) when bonding the legs (distal ends of the segment conductors) to each other with the binder (bonding agent).

The preferred embodiment has been made to solve the above-described problem, and an object of the preferred embodiment is to provide a method of manufacturing an armature capable of securing the bonding quality when bonding the distal ends of segment conductors to each other with a bonding agent.

Means for Solving the Problem

In order to achieve the above object, according to one aspect of the preferred embodiment, there is provided a method of manufacturing an armature that includes an armature core having a plurality of slots extending in a central axis direction, and a coil unit in which distal ends of a plurality of segment conductors disposed to face each other in the central axis direction are bonded with a bonding agent containing a conductive material, the method including: a step of placing the bonding agent on bonding surfaces of the distal ends of the plurality of segment conductors; a step of placing the plurality of segment conductors on the armature core such that the bonding surface of the distal end of one segment conductor of the plurality of segment conductors and the bonding surface of the distal end of another segment conductor of the plurality of segment conductors face each other; a step of bonding the distal ends to each other with the conductive material of the bonding agent; and a step of increasing a viscosity of the bonding agent placed on the distal ends, after the step of placing the bonding agent on the distal ends, and before the step of bonding the distal ends to each other.

According to the method of manufacturing an armature of the one aspect of the preferred embodiment, after the step of placing the bonding agent on the distal ends, and before the step of bonding the distal ends to each other, the viscosity of the bonding agent placed on the distal ends is increased. In this way, it is possible to place the bonding agent with a relatively low viscosity and high fluidity (for example, with an improved applicability) on the distal ends of the segment conductors. Further, since the viscosity of the bonding agent is increased after the bonding agent is placed on the distal ends, it is less likely that the bonding agent moves to other portions, and flows out from between the distal ends, before the distal ends are bonded to each other. Therefore, it is possible to secure the amount of bonding agent (conductive material) remaining on the distal ends. Accordingly, with an appropriate amount of bonding agent (conductive material), the bonding strength (fixing force) between the distal ends can be secured. As a result, the bonding quality can be secured when bonding the distal ends of the segment conductors with the bonding agent.

Effects of the Invention

According to the preferred embodiment, as described above, the bonding quality can be secured when bonding the distal ends of the segment conductors with the bonding agent.

BRIEF DESCRIPTION OF THE DRAWINGS

FIG. 6 illustrates the configuration of a general conductor according to the embodiment.

FIG. 7 is a perspective view illustrating a part of a first coil assembly according to the embodiment.

FIG. 13 is a flowchart illustrating a stator manufacturing process according to the embodiment.

FIG. 14 illustrates a step of placing the bonding agent on the first distal end and the second distal end according to the embodiment, wherein

FIG. 16 illustrates a step of placing the segment conductors in a slot according to the embodiment.

FIG. 17 illustrates the structure of the bonding agent placed between a first bonding surface and a second bonding surface according to the embodiment, wherein FIG. 17A illustrates the state before being heated and pressed, and FIG. 17B illustrates the state after being heated and pressed.

FIG. 20 illustrates the configuration of a bonding agent according to a first modification, wherein

FIG. 21 illustrates the structure of a bonding agent according to a second modification, wherein

MODES FOR CARRYING OUT THE INVENTION

Hereinafter, an embodiment of the preferred embodiment will be described with reference to the drawings.

[Structure of the Stator]

Figure 1:
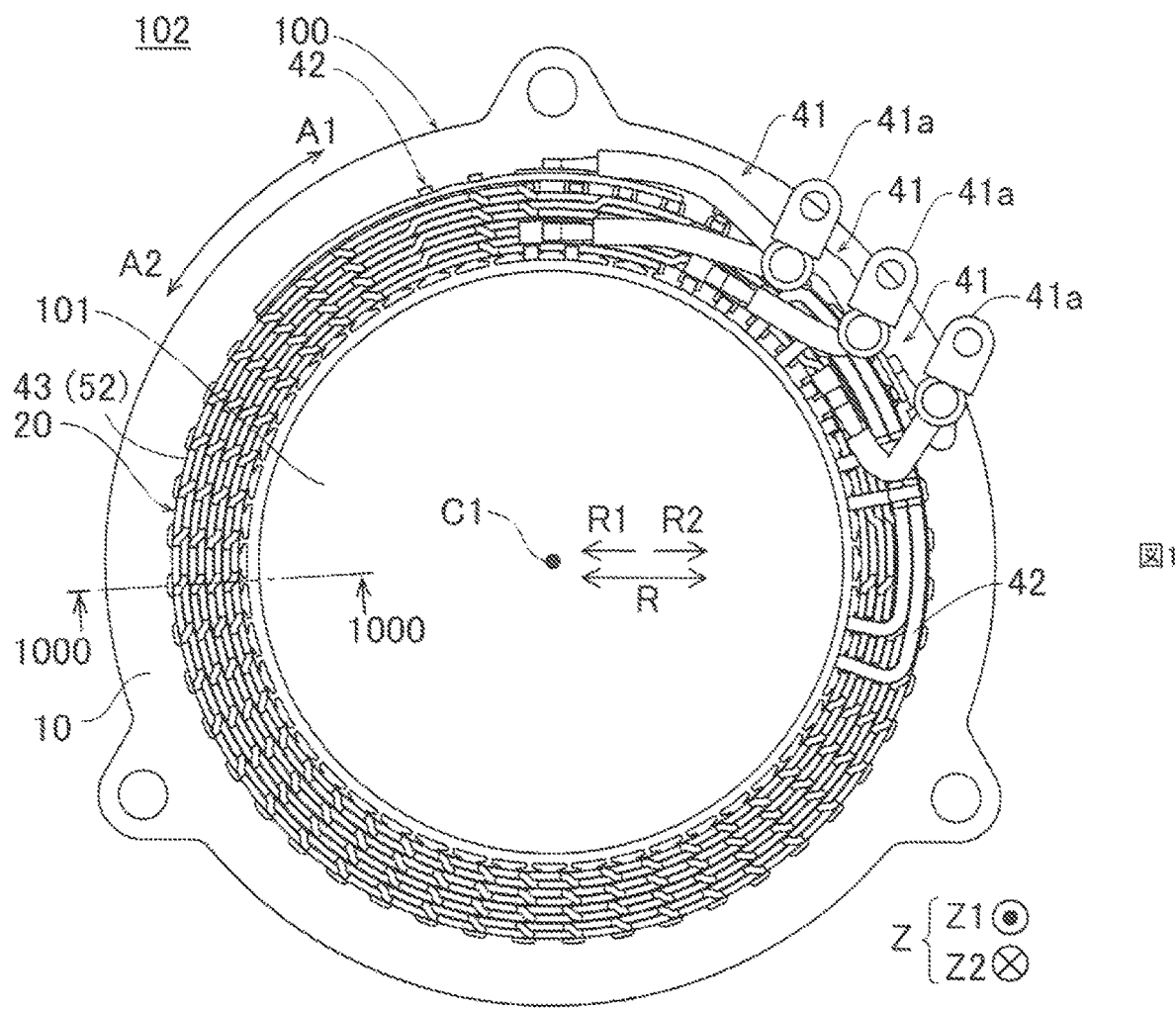
FIG. 1 is a plan view illustrating the configuration of a stator (rotary electric machine) according to an embodiment.

The structure of a stator 100 according to the present embodiment will be described with reference to FIGS. 1 to 12. As illustrated in FIG. 1, the stator 100 has an annular shape about a central axis C1. The stator 100 is an example of an "armature" in the appended claims.

As illustrated in FIG. 1, the term "axial direction (central axis direction)" as used herein refers to the direction (Z direction) along the central axis C1 of the stator 100 (rotation axis of a rotor 101). The term "circumferential direction" refers to the circumferential direction (A direction) of the stator 100. The term "radial direction" refers to the radial direction (R direction) of the stator 100. The "radially inner side" refers to the direction (R1 direction) toward the central axis C1, and the "radially outer side" refers to the direction (R2 direction) away from the central axis C1.

The stator 100 constitutes a part of the rotary electric machine 102, together with the rotor 101. The rotary electric machine 102 is configured as, for example, a motor, a generator, or a motor generator. As illustrated in FIG. 1, the stator 100 is disposed on the radially outer side of the rotor 101. That is, in the present embodiment, the stator 100 constitutes a part of the inner rotor type rotary electric machine 102.

Figure 2:
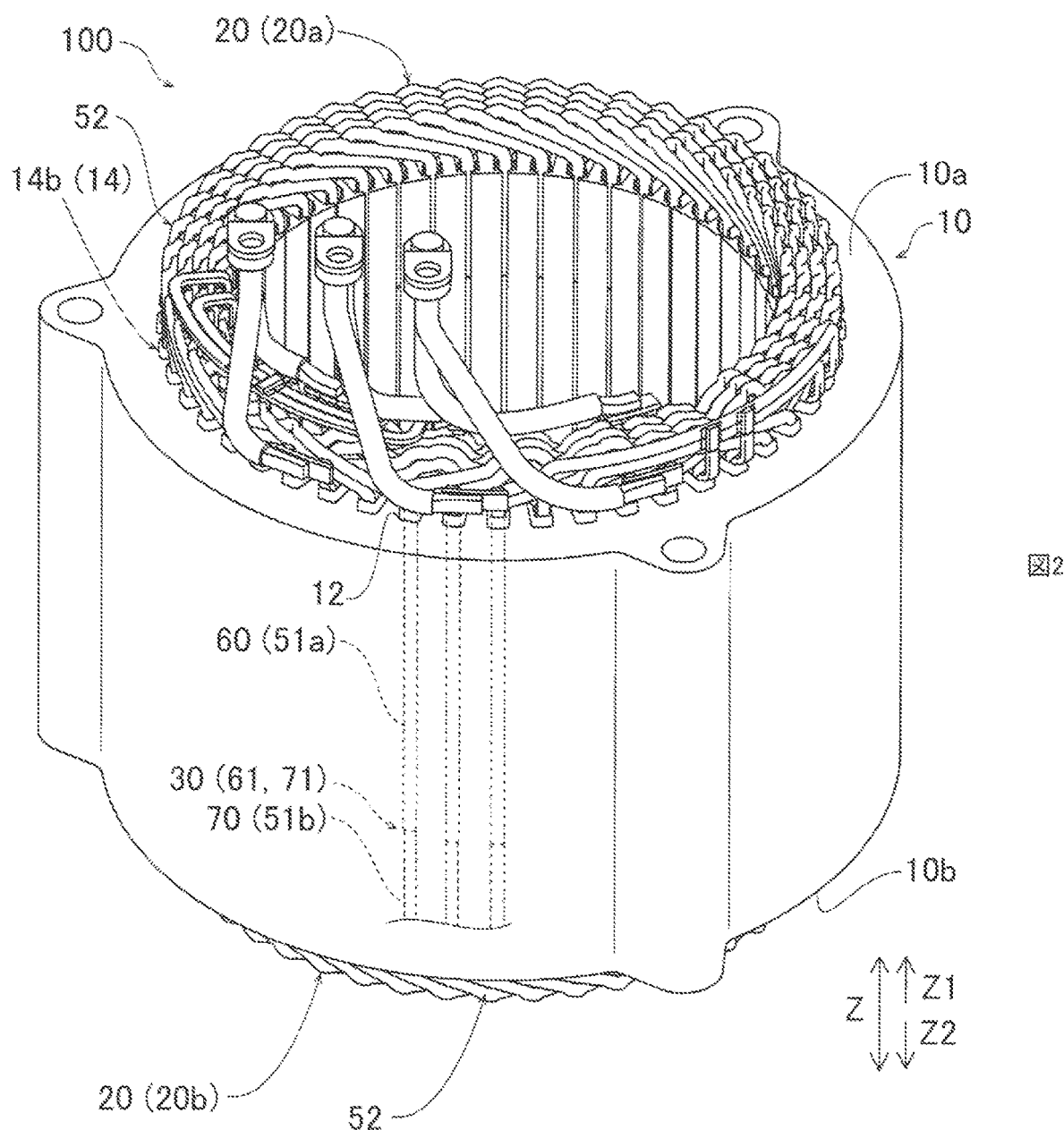
FIG. 2 is a perspective view illustrating the configuration of the stator according to the embodiment.
Figure 3:
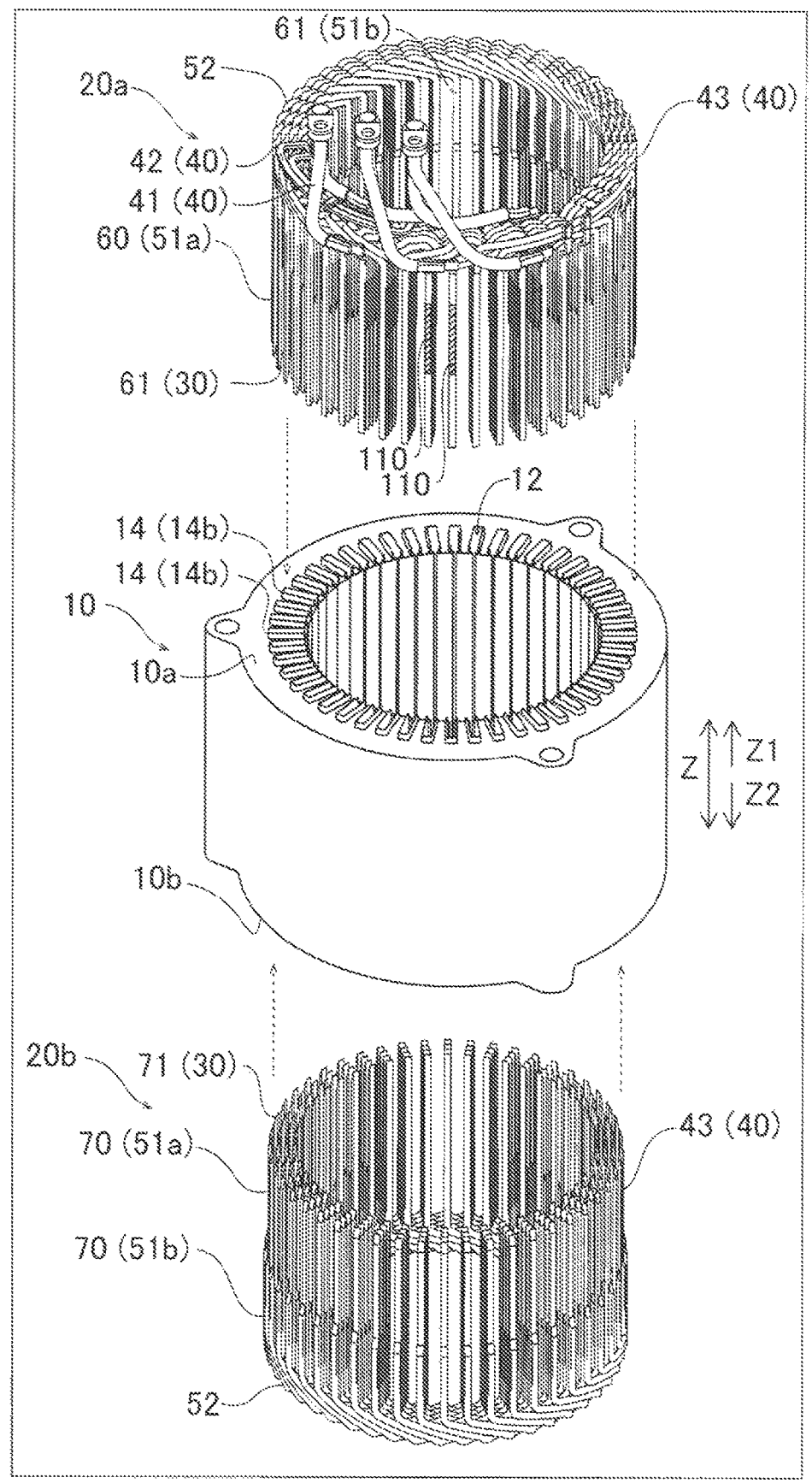
FIG. 3 is an exploded perspective view of the stator according to the embodiment.

As illustrated in FIG. 2, the stator 100 includes a stator core 10, a coil unit 20, and a bonding agent 30. Further, as illustrated in FIG. 3, the coil unit 20 includes a first coil assembly 20a and a second coil assembly 20b. The coil unit 20 is formed of a plurality of segment conductors 40. The stator core 10 is an example of an "armature core" in the appended claims.

(Structure of the Stator Core)

Figure 4:
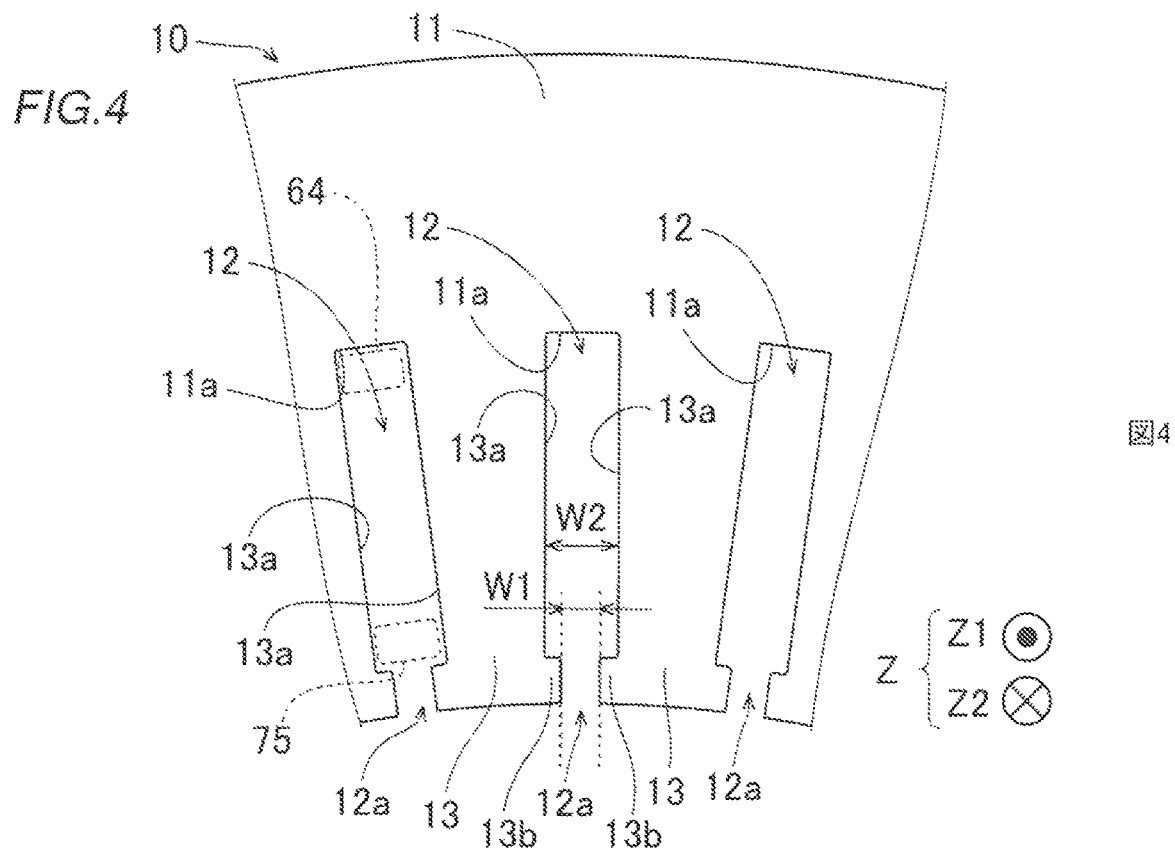
FIG. 4 is a plan view illustrating the configuration of a stator core according to the embodiment.

The stator core 10 has a cylindrical shape having the central axis C1 (see FIG. 1) as its central axis. The stator core 10 is formed by stacking a plurality of electromagnetic steel plates (for example, silicon steel plates) in the axial direction. As illustrated in FIG. 4, the stator core 10 includes a back yoke 11 having an annular shape as viewed in the axial direction, and a plurality of slots 12 disposed on the radially inner side of the back yoke 11 and extending in the axial direction. The stator core 10 includes a plurality of teeth 13 on both sides of the slots 12 in the circumferential direction.

Each slot 12 is a portion (hole) surrounded by a wall portion 11a of the back yoke 11 disposed on the radially outer side with respect to a first one-side end face 64 described below, and circumferential side surfaces 13a of two teeth 13. The slot 12 has an opening 12a that is disposed on the radially inner side with respect to a second other-side end face 75 described below and that is open toward the radially inner side. The slot 12 is open at both axial ends thereof. Each tooth 13 is formed to project radially inwardly from the back yoke 11, and includes projections 13b defining the openings 12a of the slots 12 at the radially inner end.

The opening 12a has an opening width W1 in the circumferential direction. The opening width W1 corresponds to a distance between the projection distal ends of the projections 13b of the teeth 13 (the distance in the circumferential direction of the stator core 10). A width W2 of a portion of the slot 12 where the coil unit 20 and slot insulating paper 14 are disposed is greater than the opening width W1. That is, the slot 12 is configured as a semi-open slot. Here, the width W2 corresponds to the distance between the circumferential side surfaces 13a of the teeth 13 disposed on both sides of the slot 12 in the circumferential direction. The width W2 of the slot 12 is substantially constant in the radial direction.

Figure 5:
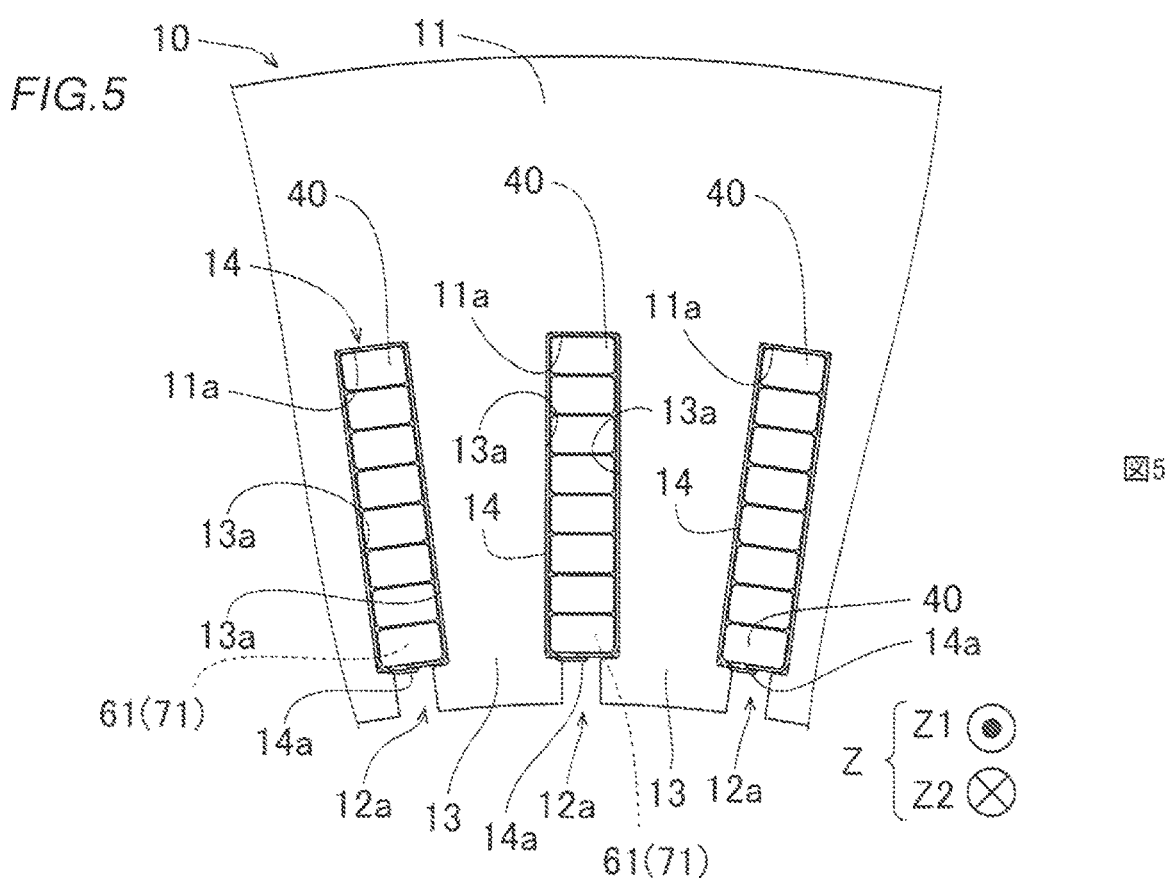
FIG. 5 is a cross-sectional view illustrating the configuration of segment conductors and slot insulating paper according to the embodiment of the preferred embodiment.

The slot insulating paper 14 is disposed in the slot 12 of the stator core 10. As illustrated in FIG. 5, the slot insulating paper 14 is disposed between the tooth 13 and the segment conductors 40. The slot insulating paper 14 includes a bonding portion covering part 14a. The bonding portion covering part 14a is configured to cover the radially inner side of at least a first distal end 61 and a second distal end 71 of the segment conductors 40 closest to the opening 12a of the slot 12 among the plurality of segment conductors 40 arranged side by side in the radial direction.

Specifically, the slot insulating paper 14 is formed of a sheet-type insulating member such as aramid paper and a polymer film, and serves to secure insulation between the segment conductors 40 (coil unit 20) and the stator core 10. The slot insulating paper 14 is disposed between the segment conductors 40 and each of the circumferential side surfaces 13a of the teeth 13, and between the radially outermost segment conductors 40 among the plurality of segment conductors 40 and the wall portion 11a. Further, as illustrated in FIG. 3, the slot insulating paper 14 includes collar portions (cuff portions) 14b projecting axially outwardly from the slot 12 on both axial sides, and folded back.

The slot insulating paper 14 is disposed to integrally cover the periphery of the plurality of segment conductors 40 arranged side by side in the radial direction as viewed in the arrow Z2 direction. In other words, the both circumferential sides and the both radial sides of the below-described in-slot portions (legs) 51a and 51b of the plurality of segment conductors 40 arranged side by side in the radial direction are covered by the slot insulating paper 14. With the slot insulating paper 14, it is possible to secure insulation of the first distal ends 61 and the second distal ends 71 from the stator core 10.

(Structure of the Coil Unit)

As illustrated in FIGS. 2 and 3, the coil unit 20 is formed by assembling and bonding the first coil assembly 20a disposed on one axial side (arrow Z1 direction side) and the second coil assembly 20b disposed on the other axial side (arrow Z2 direction side) in the axial direction. The first coil assembly 20a and the second coil assembly 20b are formed in an annular shape about the central axis C1 (see FIG. 1) common to the stator core 10.

The coil unit 20 is configured as, for example, a wave winding coil. The coil unit 20 is configured as, for example, a coil of eight turns. That is, as illustrated in FIG. 5, the coil unit 20 is formed by arranging eight segment conductors 40 side by side in the radial direction in each slot 12. The coil unit 20 is configured to receive a three-phase AC power supplied from a power supply (not illustrated) such that an electric current flows in the circumferential direction while reciprocating in the axial direction, thereby generating a magnetic flux. For example, the coil unit 20 has a connection formed by a Y-connection of three phases.

<Structure of the Coil Assembly>

As illustrated in FIG. 3, the first coil assembly 20a includes a plurality of (for example, three) power line connection segment conductors 41 (hereinafter referred to as "power conductors 41") as the segment conductors 40, a plurality of (for example, two) neutral point connection segment conductors 42 (hereinafter referred to as "neutral point conductors 42") as the segment conductors 40, and a plurality of general conductors 43 that are the conductors (general segment conductors 40) different from the power conductors 41 and the neutral point conductors 42 among the plurality of segment conductors 40 and that form the coil unit 20. The second coil assembly 20b includes a plurality of general conductors 43. The second coil assembly 20b preferably includes only the plurality of general conductors 43, and the first coil assembly 20a includes all the power conductors 41 and neutral point conductors 42 to be provided in the stator 100.

(Structure of the Segment Conductor)

As illustrated in FIG. 5, the segment conductor 40 is configured as a rectangular conductor having a substantially rectangular shape in the transverse cross section. The segment conductor 40 includes a conductive material (metal material such as copper and aluminum) and an insulating film (coating agent such as polyimide or the like) disposed thereon. The conductive material of the segment conductor 40 is preferably copper.

As illustrated in FIG. 2, the segment conductor 40 includes the in-slot portions 51a and 51b that are disposed in the slots 12, and a coil end portion 52. The in-slot portions 51a and 51b are portions disposed in the slots 12 from an axial position of an end face 10a or 10b of the stator core 10. The coil end portion 52 is a portion formed to be continuous with the in-slot portions 51a and 51b and disposed on the axially outer side with respect to the end face 10a or 10b of the stator core 10. The coil end portion 52 has a bent shape bent in the axial direction, and has an offset portion that is offset in the radial direction at the bent portion.

<Structure of the General Conductor>

As illustrated in FIG. 6, the general conductor 43 includes paired in-slot portions 51a and 51b that are placed in different slots 12, and the coil end portion 52 connecting the paired in-slot portions 51a and 51b. Accordingly, the general conductor 43 has a substantially U-shape or a substantially J-shape as viewed from the radially inner side. The in-slot portions 51a and 51b are formed to extend linearly in the axial direction. The in-slot portions 51a and 51b of the power conductors 41 and the in-slot portions 51a and 51b of the neutral point conductors 42 have the same configuration as the in-slot portions 51a and 51b of the general conductor 43, and a description thereof will be omitted.

The axial lengths of the paired in-slot portions 51a and 51b are different from each other. Specifically, an axial length L1 of the in-slot portion 51a is greater than an axial length L2 of the in-slot portion 51b. Note that the axial length L1 (L2) of the in-slot portion 51a (51b) indicates the length from a tip 62 described below to the axial position corresponding to the end face 10a of the stator core 10 in the axial direction. The axial lengths L1 and L2 are less than an axial length L3 of the stator core 10. Note that the axial length L3 of the stator core 10 indicates the distance (interval) between the end faces 10a and 10b in the axial direction. For example, the axial length L1 is greater than half the axial length L3, and the axial length L2 is less than half the axial length L3.

Among the plurality of in-slot portions 51a and 51b, the in-slot portions 51a and 51b disposed in the first coil assembly 20a are each hereinafter referred to as a first in-slot portion 60, and the in-slot portions 51a and 51b disposed in the second coil assembly 20b are each hereinafter referred to as a second in-slot portion 70. The segment conductor 40 including the first in-slot portion 60 is an example of "one segment conductor" in the appended claims. The segment conductor 40 including the second in-slot portion 70 is an example of "another segment conductor" in the appended claims.

<Structure of the Power Conductor and the Neutral Point Conductor>

As illustrated in FIG. 7, each power conductor 41 is formed by electrically connecting (joining) a plurality of first in-slot portions 60 and a power terminal member 41a. The power conductor 41 serves to introduce electric power from the power supply (not illustrated) to the coil unit 20. For example, a total of three power conductors 41 are provided, one for each phase. Each neutral point conductor 42 is formed by electrically connecting (joining) a plurality of first in-slot portions 60 and neutral point coil ends 42a. For example, a plurality of (two in the example of FIG. 7) neutral point conductors 42 are provided. The neutral point conductor 42 serves to electrically connect the neutral point ends of the respective phases.

(Configuration of the Bonding Agent)

Figure 8:
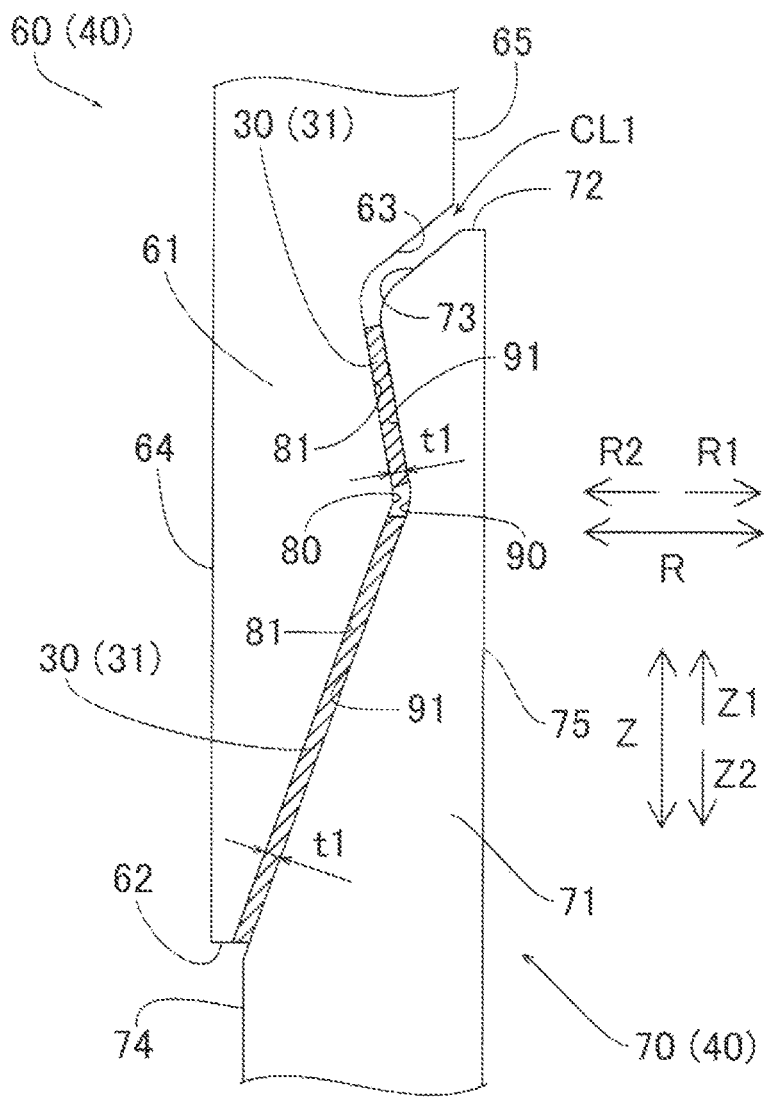
FIG. 8 illustrates the configuration of a first distal end and a second distal end according to the embodiment.

As illustrated in FIG. 8, in the present embodiment, the first distal end 61 and the second distal end 71 of the plurality of segment conductors 40 disposed to face each other in the axial direction are bonded with the bonding agent 30 containing a conductive material 31 in each slot 12 (see FIG. 2). Specifically, the first distal end 61 and the second distal end 71 are electrically and mechanically connected (bonded) by being metallically bonded to the conductive material 31 placed between the first distal end 61 and the second distal end 71. Thus, the bonding agent 30 fixes the plurality of different segment conductors 40 to each other, and serves to electrically conduct the plurality of different segment conductors 40. Note that the first distal end 61 is a distal end of the first in-slot portion 60 of the segment conductor 40 included in the first coil assembly 20a. The second distal end 71 is a distal end of the second in-slot portion 70 of the segment conductor 40 included in the second coil assembly 20b.

For example, the bonding agent 30 is disposed between a first bonding surface 81 of the first distal end 61 and a second bonding surface 91 of the second distal end 71, and has a substantially constant thickness t1. In FIG. 8, the thickness of the bonding agent 30 is exaggerated, and is not limited to the example of FIG. 8.

Figure 9:
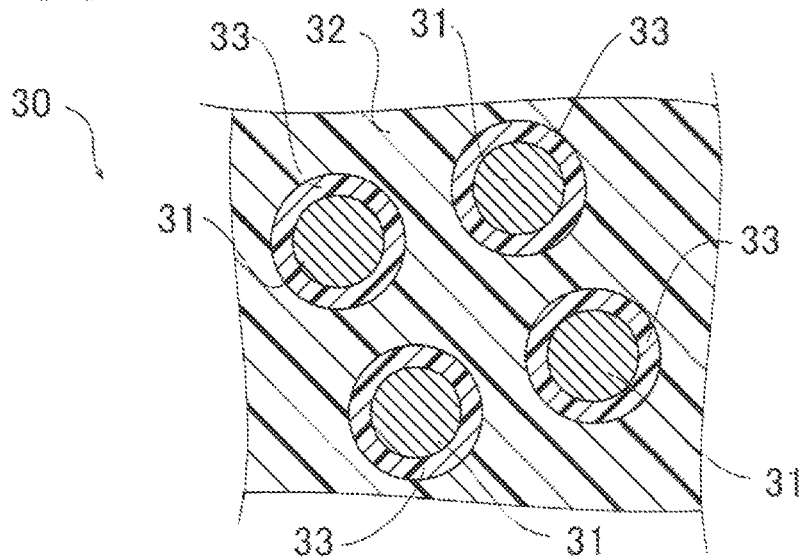
FIG. 9 illustrates the configuration of a bonding agent (at the time of manufacturing the stator) according to the embodiment.

As illustrated in FIG. 9, in the present embodiment, at the time of manufacturing the stator 100, the bonding agent 30 contains the conductive material 31, a volatile agent 32, and a covering material 33 that covers at least a part of the periphery (surface) of the conductive material 31. For example, the bonding agent 30 is a pasty bonding agent (binder) containing the particulate conductive material 31. The bonding agent 30 is preferably a silver particle paste (silver nano paste). Further, as illustrated in FIG. 8, the bonding agent 30 is solid when the stator 100 is completed. That is, when the stator 100 is completed, the bonding agent 30 contains the conductive material 31, but the volatile agent 32 and the covering material 33 are volatized and do not remain, or only a very small amount remains.

<Configuration of the Conductive Material>

The conductive material 31 is preferably in the form of metal particles with a size reduced to nanometer order or micrometer order. The metal particles may be, but not limited to, silver, copper, gold or nickel. The conductive material 31 has, for example, an average particle diameter of nanometer order or micrometer order (equal to or greater than 1 nm and less than 1,000 μm). The conductive material 31 is preferably silver particles with a size reduced to a nanometer level. The melting point of the conductive material 31 is higher than the upper limit value of a bonding temperature range R12 described below.

<Configuration of the Volatile Agent>

The volatile agent 32 serves as a solvent for the conductive material 31 of the bonding agent 30. That is, the volatile agent 32 servers to disperse the particles of the conductive material 31 in the volatile agent 32 (solvent) so as to prevent the particles of the conductive material 31 from metallically bonding to each other. Examples of the volatile agent 32 may include an alcoholic solvent (organic solvent). However, the volatile agent 32 may be a solvent other than an alcoholic solvent.

The volatile agent 32 is liquid at an ordinary temperature T1. The volatile agent 32 is configured to volatilize when heated to a temperature T2 (for example, a temperature higher than or equal to 100° C. and lower than or equal to 130° C.) that is higher than the ordinary temperature T1 and in a volatilization temperature range R11. That is, the lower limit value of the volatilization temperature range R11 is, for example, the boiling temperature of the volatile agent 32. The upper limit value of the volatilization temperature range R11 is a temperature lower than a bonding temperature range R12 described below. The ordinary temperature T1 is, for example, the ordinary temperature (20° C.±15° C.) defined in Japanese Industrial Standards (JIS).

A viscosity μ11 of the volatile agent 32 alone is less than a viscosity μ1 of the whole bonding agent 30. In other words, the fluidity of the volatile agent 32 alone is higher than the fluidity of the whole bonding agent 30. Accordingly, as the content ratio of the volatile agent 32 to the whole bonding agent 30 decreases (as the amount of the volatile agent 32 volatilized increases), the viscosity of the whole bonding agent 30 increases (the fluidity decreases). Then, the viscosity of the bonding agent 30 reaches μ2 when substantially all the volatile agent 32 is volatilized (see FIG. 10). For example, the bonding agent 30 becomes solid (powder form) when substantially all the volatile agent 32 is volatilized (temporarily cured).

<Configuration of the Covering Material>

The covering material 33 is configured to cover at least a part of the periphery (surface) of the conductive material 31 in the volatile agent 32. For example, the covering material 33 serves to prevent clumping of the particles (contact between the particles) of conductive material 31 by adhering to the surface of the particles of the conductive material 31. The covering material 33 is a material that prevents oxidation, and serves to improve the dispersibility of the particles of the conductive material 31 by adhering to the conductive material 31. Further, the covering material 33 servers to prevent oxidation of the conductive material 31 (serves as a protective agent), and serves to prevent metallic bonding between the particles of the conductive material 31, by covering the surface of the conductive material 31, in the bonding agent 30. The covering material 33 is preferably a resin material. Examples of the covering material 33 may include a phosphoric acid covering material. However, the covering material 33 may be a material other than a phosphoric acid covering material.

Figure 11:
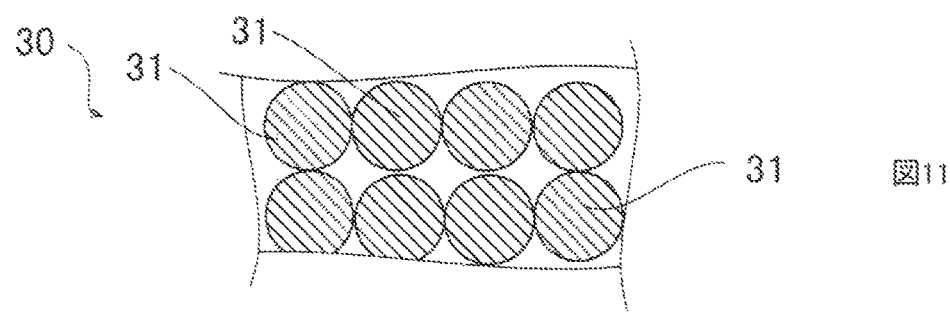
FIG. 11 illustrates the configuration of the bonding agent (in a bonded state) according to the embodiment.

The covering material 33 has a property of melting and volatilizing when heated to a temperature T3 (for example, higher than or equal to 250° C. and lower than or equal to 300° C.) in the bonding temperature range R12. That is, when the covering material 33 melts and moves from the surface of the conductive material 31, or is volatilized and removed from the bonding agent 30, the conductive material 31 turns into a metallically bondable state. That is, the lower limit value of the bonding temperature range R12 is, for example, a temperature higher than or equal to the melting point of the covering material 33, and preferably a temperature higher than or equal to the boiling point. The upper limit value of the bonding temperature range R12 is set to, for example, a temperature lower than or equal to the upper limit value of a heat-resistant temperature range R13 of an insulating member 110 described below. For example, as illustrated in FIG. 11, the bonding agent 30 is configured such that, after the covering material 33 is volatilized, the remaining particles of the conductive material 31 are metallically bonded, and then the conductive material 31 is metallically bonded to the first bonding surface 81 and the second bonding surface 91.

(Structure of the Distal End of the Segment Conductor)

As illustrated in FIG. 8, the first distal end 61 includes the first bonding surface 81 that is bonded to the second distal end 71, and has a projection 80 projecting toward the second in-slot portion 70. The second distal end 71 includes the second bonding surface 91 that is a facing surface facing the first bonding surface 81 and that is bonded to the first bonding surface 81, and has a recess 90 facing the projection 80. The projection 80 and the recess 90 are disposed to face and engage with each other in the radial direction. The projection 80 is formed to project to the one radial side (arrow R1 direction). The recess 90 is formed to be recessed to the one radial side (arrow R1 direction). Each of the first bonding surface 81 and the second bonding surface 91 is configured as a flat surface.

The "first distal end 61" indicates not only the tip 62 defining the arrow-Z2-direction-side end in the axial direction, but also a portion of the first in-slot portion 60 in the vicinity of the projection 80. That is, the first distal end 61 is provided with the projection 80, the tip 62, a spaced facing surface 63, the first one-side end face 64, and a first other-side end face 65. The "second distal end 71" indicates not only a tip 72 defining the arrow-Z1-direction-side end in the axial direction, but also a portion of the second in-slot portion 70 in the vicinity of the recess 90. That is, the second distal end 71 is provided with the recess 90, the tip 72, a spaced facing surface 73, a second one-side end face 74, and a second other-side end face 75.

The bonding agent 30 (conductive material 31) is disposed in at least the space between the first bonding surface 81 of the projection 80 and the second bonding surface 91 of the recess 90, in the space between the first distal end 61 and the second distal end 71.

Each of the tips 62 and 72 is formed as a flat surface orthogonal to the axial direction. The spaced facing surface 63 is formed to be continuous with the projection 80 and the first other-side end face 65. The spaced facing surface 73 is disposed to face the spaced facing surface 63 in the radial direction (or in the axial direction), and is formed to be continuous with the recess 90 and the second other-side end face 75. The spaced facing surface 63 and the spaced facing surface 73 are spaced away from each other, defining a clearance CL1.

The first one-side end face 64 defining the radially-outer-side (arrow-R2-direction-side) end face of the first distal end 61 is disposed on the radially outer side of the second one-side end face 74 defining the radially-outer-side (arrow-R2-direction-side) end face of the second distal end 71. The second other-side end face 75 defining the radially-inner-side (arrow-R1-direction-side) end face of the second distal end 71 is disposed on the radially inner side of the first other-side end face 65 defining the radially-inner-side (arrow-R1-direction-side) end face of the first distal end 61.

Figure 12:
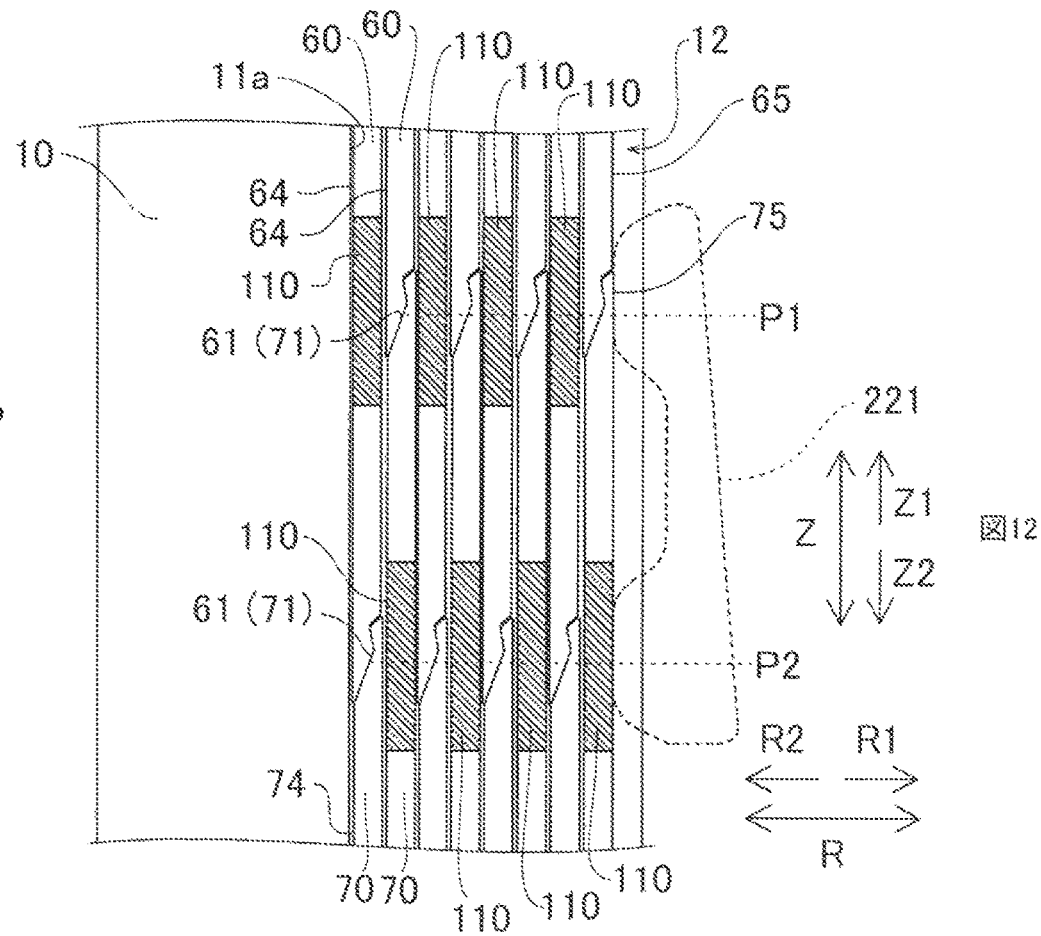
FIG. 12 illustrates a part of a cross section taken along line 1000-1000 in FIG. 1.

As illustrated in FIG. 12, a plurality of (for example, eight) first in-slot portions 60 are disposed side by side (adjacent to each other) in the radial direction, and a plurality of (for example, eight) second in-slot portions 70 are disposed side by side (adjacent to each other) in the radial direction, in each slot 12. Then, in the slot 12, an axial position P1 of the first distal end 61 of one first in-slot portion 60 of the plurality of first in-slot portions 60 arranged side by side is different from an axial position P2 of the first distal end 61 of another first in-slot portion 60 adjacent thereto in the radial direction. That is, the plurality of first distal ends 61 are alternately arranged in the axial positions P1 and P2 in the radial direction. Similar to the first distal ends 61, the plurality of second distal ends 71 are alternately arranged in the axial positions P1 and P2 in the radial direction.

<Configuration of the Insulating Member>

As illustrated in FIG. 12, insulating members 110 are disposed on the coil unit 20. For example, each insulating member 110 is formed by winding a sheet-type insulating material, such as polyimide, around (the outer periphery of) an insulating covering. The heat-resistant temperature range R13 of the insulating member 110 is a temperature range higher than the upper limit value of the bonding temperature range R12. Specifically, the insulating member 110 is disposed on one in-slot portion of the plurality of first in-slot portions 60 or the second in-slot portions 70 arranged side by side, in the axial position corresponding to the first distal end 61 (or the second distal end 71) of another in-slot portion disposed adjacent thereto in the radial direction. That is, the insulating member 110 is disposed in the position (P1 or P2) adjacent to the position where the bonding agent 30 is placed in the radial direction. Further, as illustrated in FIG. 6, the insulating member 110 is disposed on the in-slot portion 51*a* having a greater axial length out of the in-slot portions 51*a* and 51*b*. Note that although only a few of the plurality of insulating members 110 are illustrated (hatched) in FIG. 3, the insulating members 110 are provided one for each of the in-slot portions 51*a*.

[Method of Manufacturing the Stator]

In the following, a method of manufacturing the stator 100 according to the present embodiment will be described. FIG. 13 is a flowchart illustrating steps of manufacturing the stator 100.

First, in step S1, the plurality of segment conductors 40 are prepared. Specifically, as illustrated in FIGS. 6 and 7, the plurality of power conductors 41, the plurality of neutral point conductors 42, and the plurality of general conductors 43 that form the other part of the coil unit 20 are prepared (formed).

In step S2, as illustrated in FIG. 6, the insulating member 110 is attached to the outer periphery of the insulating film on each of the in-slot portion 51*a* of the segment conductors 40. For example, the insulating member 110 is attached to each of the in-slot portions 51*a* of all the segment conductors 40.

In step S3, the bonding agent 30 is prepared. As illustrated in FIG. 9, in the present embodiment, the bonding agent 30 containing the conductive material 31, the volatile agent 32, and the covering material 33 that covers at least a part of the periphery of the conductive material 31 is prepared.

(Step of Placing the Bonding Agent)

Figure 14A:
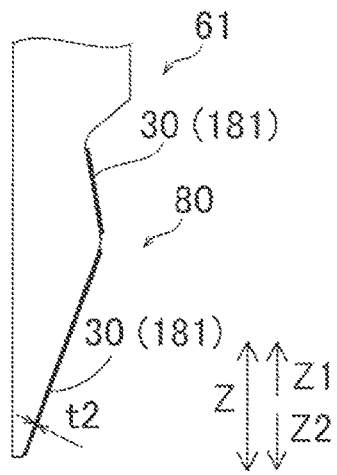
FIG. 14A illustrates the first distal end.
Figure 14B:
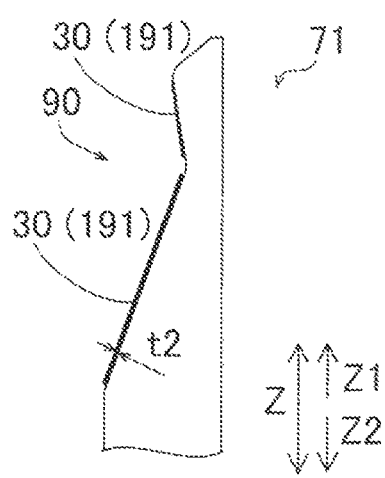
FIG. 14B illustrates the second distal end.

In step S4, the bonding agent 30 is placed on at least either one of the first distal end 61 and the second distal end 71 of the plurality of segment conductors 40. In the present embodiment, as illustrated in FIG. 14, the bonding agent 30 is applied to both the first distal end 61 and the second distal end 71. Specifically, the bonding agent 30 is applied to both a first surface 181 as the first bonding surface 81 of the first distal end 61 and a second surface 191 as the second bonding surface 91 of the second distal end 71. For example, the bonding agent 30 having a substantially constant thickness t2 is applied to both the first surface 181 (FIG. 12A) and the second surface 191 (FIG. 12B) by a non-illustrated applicator. That is, the bonding agent 30 is applied to all the first distal ends 61 and second distal ends 71 of the plurality of segment conductors 40 included in the coil unit 20.

(Step of Increasing the Viscosity of the Bonding Agent)

In step S5, after the step (S4) of placing the bonding agent 30 on the first distal end 61 and the second distal end 71, and before the step (S10) of bonding the first distal end 61 and the second distal end 71, the viscosity of the bonding agent 30 placed on the first distal end 61 and the second distal end 71 is increased from μ1 to μ2 that is greater than μ1. Preferably, step S5 is performed before the step (S8) of placing the plurality of segment conductors 40 in the slots 12, and before the step (S6) of forming the first coil assembly 20a and the second coil assembly 20b.

Figure 10:
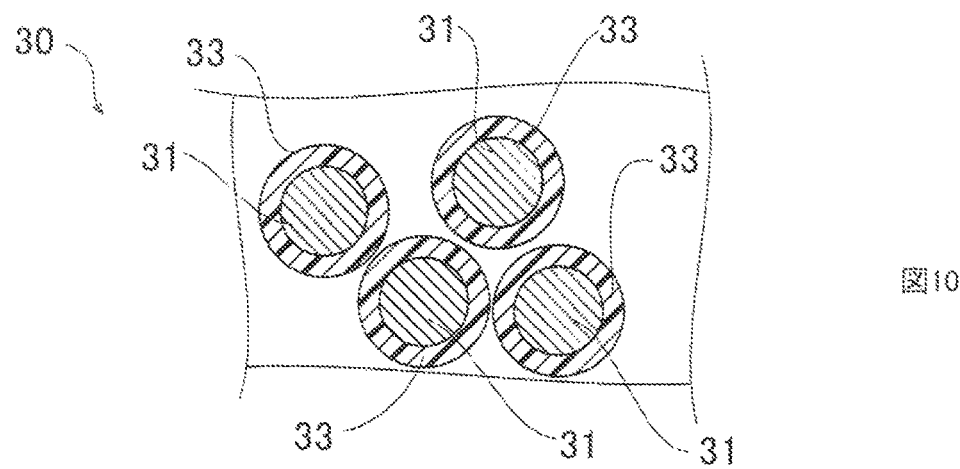
FIG. 10 illustrates the configuration of the bonding agent (with an increased viscosity) according to the embodiment.

In the present embodiment, the viscosity of the bonding agent 30 is increased from μ1 to μ2 that is greater than μ1, by volatilizing at least a part of the volatile agent 32 contained in the bonding agent 30. That is, the volatile agent 32 has the viscosity μ11 that is less (more fluid) than the viscosity μ1 of the whole bonding agent 30 before the volatile agent 32 is volatilized. Therefore, when the volatile agent 32 is volatilized to reduce the content ratio of the volatile agent 32 in the bonding agent 30, the viscosity of the whole bonding agent 30 is increased from μ1 to μ2. That is, the bonding agent 30 is temporarily cured in this step. For example, as illustrated in FIG. 10, when substantially all the volatile agent 32 is volatilized, the bonding agent 30 containing the conductive material 31 and the covering material 33 is in a substantially solid form (solid, powder form). In other words, at least a part of the bonding agent 30 is dried.

Specifically, the volatile agent 32 volatilizes when heated by a heating device 210 included in a manufacturing device 200 for the stator 100. Examples of the heating device 210 may include a heating furnace, a heating plate (hot plate), and an induction heating device.

Figure 15:
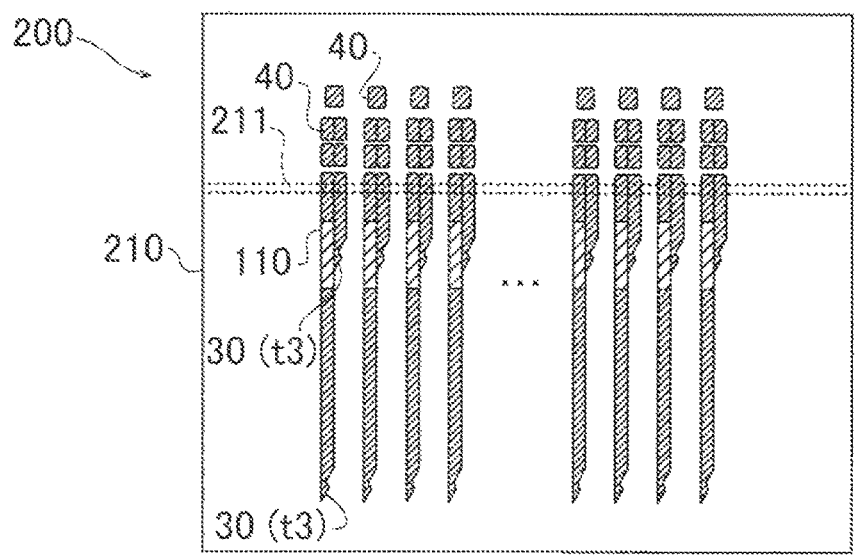
FIG. 15 illustrates a step of increasing the viscosity of the bonding agent according to the embodiment.

For example, as illustrated in FIG. 15, the plurality of segment conductors 40 with the bonding agent 30 placed thereon (applied thereto) are placed in the heating device 210 configured as a heating furnace, so that at least the bonding agent 30 out of the bonding agent 30 and the segment conductors 40 is heated. For example, in the heating device 210, a holding jig 211 holds the plurality of segment conductors 40 to hung the plurality of segment conductors 40 side by side, and hot air is blown thereto to heat the bonding agent 30. Then, the temperature of the bonding agent 30 is increased from the ordinary temperature T1 to the temperature T2 in the volatilization temperature range R11 of the volatile agent 32, so that the volatile agent 32 is volatilized. Preferably, substantially all the volatile agent 32 contained in the bonding agent 30 is volatilized. As the volatile agent 32 in the bonding agent 30 volatilizes, the volume of the bonding agent 30 decreases, so that the thickness of the bonding agent 30 changes to the thickness t3 that is less than the thickness t2.

(Step of Forming the First Coil Assembly and the Second Coil Assembly)

In step S6, as illustrated in FIG. 3, the plurality of segment conductors 40 on which the bonding agent 30 with the viscosity increased to μ2 is placed are arranged in an annular shape, so that the annular first coil assembly 20a and second coil assembly 20b including the plurality of segment conductors 40 are formed. For example, the annular first coil assembly 20a is formed such that the power conductors 41 corresponding to the three phases, the neutral point conductors 42, and the plurality of general conductors 43 are arranged in the substantially same arrangement relationship as when they are arranged in the plurality of slots 12 (when the stator 100 is completed). Also, the annular second coil assembly 20b is formed such that the plurality of general conductors 43 are arranged in the substantially same arrangement relationship as when they are arranged in the plurality of slots 12.

(Step of Placing the Slot Insulating Paper in the Slots)

In step S7, as illustrated in FIG. 3, the slot insulating paper 14 is placed in each of the plurality of slots 12. The slot insulating paper 14 is placed with its radially inner side and its two axial sides partially or completely open. The placed slot insulating paper 14 is held in the slot 12 by its collar portions 14b on the two axial sides.

(Step of Placing the Segment Conductors in the Slots)

In step S8, as illustrated in FIG. 16, the plurality of segment conductors 40 are placed in the plurality of slots 12. That is, the first coil assembly 20a and the second coil assembly 20b are inserted in the plurality of slots 12.

Specifically, as illustrated in FIG. 3, the first coil assembly 20a is placed on the arrow Z1 direction side of (for example, directly above) the stator core 10. Further, the second coil assembly 20b is placed on the arrow Z2 direction side of (for example, directly below) the stator core 10. Then, as illustrated in FIG. 16, the first coil assembly 20a and the second coil assembly 20b are moved relative to the plurality of slots 12 in the axial direction, so that each of the in-slot portions 51a and 51b of the first coil assembly 20a and the second coil assembly 20b is placed in the corresponding slot 12 of the plurality of slots 12. For example, the first coil assembly 20a is translated (linearly moved) with respect to the stator core 10 in the arrow Z2 direction, and the second coil assembly 20b is translated (linearly moved) with respect to the stator core 10 in the arrow Z1 direction. As a result, each of the in-slot portions 51a and 51b is placed in the corresponding slot 12 (slot 12 with the slot insulating paper 14 disposed thereon) of the plurality of slots 12.

As a result, as illustrated in FIG. 17A, in the present embodiment, the first surface 181 of the first distal end 61 of one segment conductor 40 of the plurality of segment conductors 40 and the second surface 191 of the second distal end 71 of another segment conductor 40 of the plurality of segment conductors 40 face each other in the radial direction. Then, the projection 80 and the recess 90 engage with each other in the radial direction (see FIG. 8). In this step, the bonding agent 30 with a viscosity increased to μ2 is filled between the first surface 181 and the second surface 191. For example, if the bonding agent 30 is applied to both the first surface 181 and the second surface 191, the thickness of the bonding agent 30 is substantially double the thickness t3.

Further, as illustrated in FIG. 8, the first one-side end face 64 is placed to project (is offset) to the radially outer side with respect to the second one-side end face 74, and the second other-side end face 75 is placed to project (is offset) to the radially inner side with respect to the first other-side end face 65. Further, as illustrated in FIG. 12, the insulating member 110 is located at the axial position (P1 or P2) corresponding to the first distal end 61 of the first in-slot portion 60 or the second distal end 71 of the second in-slot portion 70 disposed adjacent thereto in the radial direction.

(Step of Covering the First Distal End and the Second Distal End with the Slot Insulating Paper)

Figure 18:
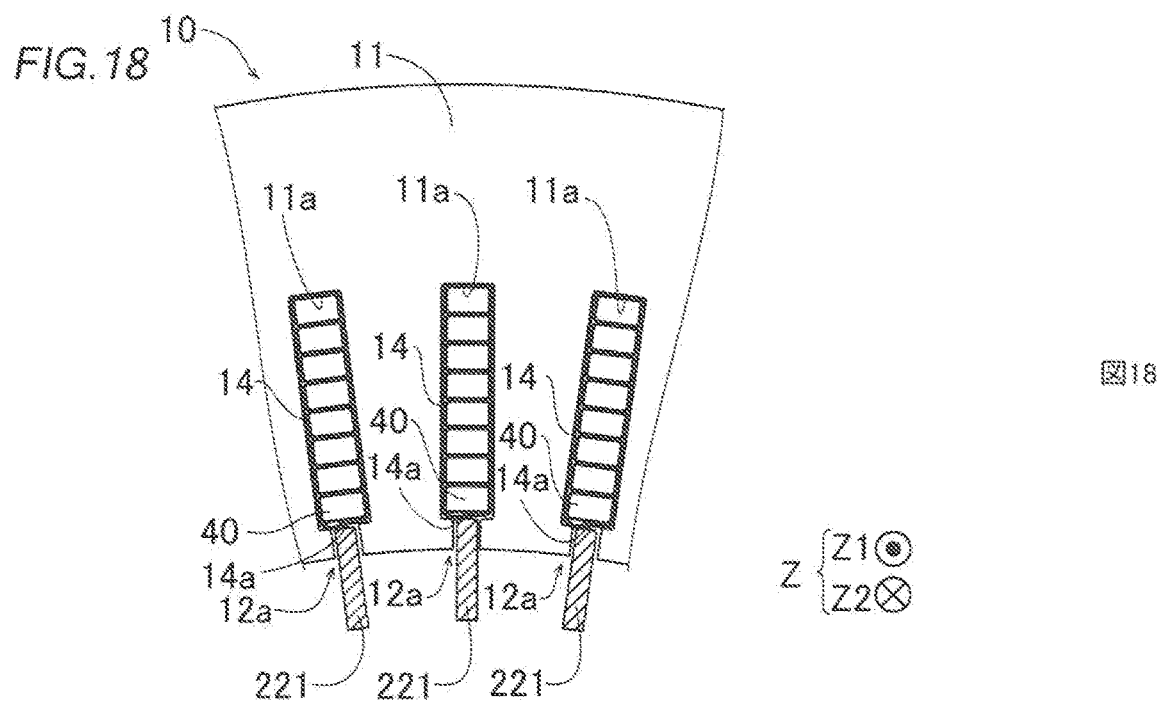
FIG. 18 illustrates a plan view cross section illustrating a step of pressing the segment conductors with a pressing jig and a wall portion according to the embodiment.

In step S9, as illustrated in FIG. 18, the radially inner side of the radially innermost first distal end 61 and second distal end 71 bonded with the bonding agent 30 is covered with the slot insulating paper 14. In this manner, the bonding portion covering part 14a covering at least the first distal end 61 and the second distal end 71 is formed.

(Step of Bonding the First Distal End and the Second Distal End)

In step S10, the first distal end 61 and the second distal end 71 are bonded with the conductive material 31 of the bonding agent 30 in each slot 12. That is, in the present embodiment, as the covering material 33 contained in the bonding agent 30 is melted and volatilized, the first distal end 61 and the second distal end 71 are bonded with the conductive material 31 remaining between the first distal end 61 and the second distal end 71. Also, the first distal end 61 and the second distal end 71 covered with the slot insulating paper 14 are bonded to each other, by being pressed together with the slot insulating paper 14.

Figure 19:
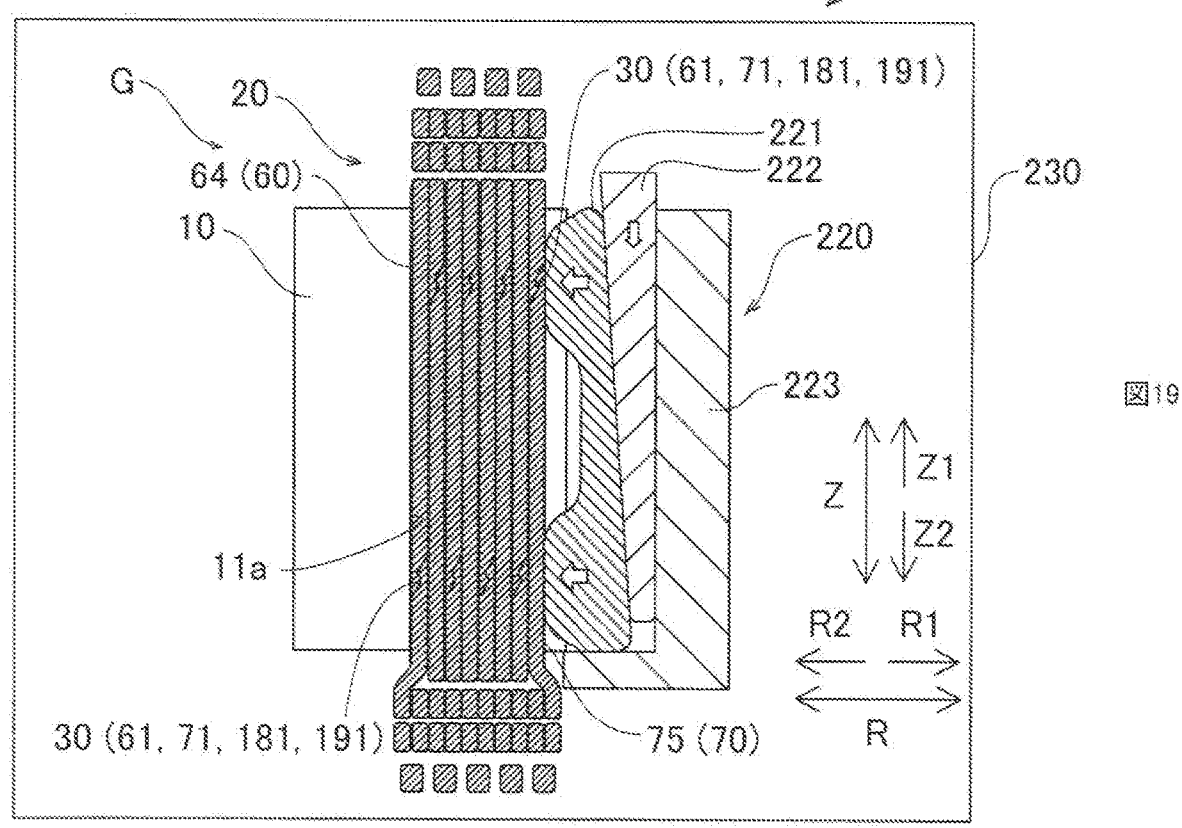
FIG. 19 illustrates a cross-sectional view taken along the radial direction and illustrating the step of pressing the segment conductors with the pressing jig and the wall portion according to the embodiment.

In this step, as illustrated in FIG. 19, in the present embodiment, the bonding agent 30 is heated while the first surface 181 of the first in-slot portion 60 and the second surface 191 of the second in-slot portion 70 are pressed against each other in the radial direction, so that the first distal end 61 and the second distal end 71 are bonded. Specifically, at least the bonding agent 30 is heated by a firing device 230 while the first in-slot portion 60 and the second in-slot portion 70 are pressed by a pressing jig 220 as a part of the manufacturing device 200, so that at least a part (first surface 181) of the first distal end 61 and at least a part (second surface 191) of the second distal end 71 are bonded with the conductive material 31 of the bonding agent 30. As a result, as illustrated in FIG. 17B, the first surface 181 becomes the first bonding surface 81, and the second surface 191 becomes the second bonding surface 91.

Specifically, as illustrated in FIG. 19, the pressing jig 220 includes movable members 221, a pressing member 222, and a holding member 223. The same number of movable members 221 as the number of slots 12 are provided. The movable members 221 are disposed in the respective openings 12a (see FIG. 18). The holding member 223 is configured to hold the movable members 221 and the pressing member 222. The pressing member 222 is formed in, for example, a wedge shape (tapered shape) that narrows toward one side in the axial direction. As the pressing member 222 moves in the axial direction, the pressing member 222 presses the movable members 221 radially outward and moves the movable members 221 radially outward, thereby transmitting the pressing force to the segment conductors 40. Then, the plurality of segment conductors 40 (the plurality of first in-slot portion 60 and the plurality of second in-slot portions 70) arranged side by side in the radial direction are held at both radial sides by the pressing jig 220 and the wall portion 11a of the stator core 10, and the plurality of segment conductors 40 arranged side by side in the radial direction are pressed by the pressing jig 220 and the wall portion 11a from both radial sides.

Specifically, as illustrated in FIG. 19, the second in-slot portion 70 is pressed radially outward by the pressing jig 220, while the pressing jig 220 is in contact with the second other-side end face 75 of the radially innermost second in-slot portion 70 among the plurality of second in-slot portions 70. Further, the first in-slot portion 60 is pressed radially inward by the wall portion 11a of the stator core 10, while wall portion 11a is in contact with the first one-side end face 64 of the radially outermost first in-slot portion 60 among the plurality of first in-slot portions 60.

As a result, as illustrated in FIG. 17B, the first surface 181 and the second surface 191 are pressed against each other in the mutually facing direction (radial direction). Then, the covering material 33 volatilizes, and the thickness of the bonding agent 30 changes to the thickness t1. In response to a change in the thickness of the bonding agent 30, the distance between the first surface 181 and the second surface 191 decreases (the first surface 181 and the second surface 191 move). Therefore, the space between the first surface 181 and the second surface 191 remains filled with the bonding agent 30 (conductive material 31).

As illustrated in FIG. 19, examples of the firing device 230 include a heating furnace, a heating plate, and an induction heating device. Preferably, the heating device 210 also serves as the firing device 230. For example, the inside of the firing device 230 is filled with inert gas (for example, nitrogen gas) G, and the first distal end 61 and the second distal end 71 are heated and pressed in the atmosphere of inert gas G. Accordingly, the conductive material 31 can be prevented from oxidation.

Then, the bonding agent 30 is heated (fired) to the temperature T3 (for example, higher than or equal to 250° C. and lower than or equal to 300° C.) in the bonding temperature range R12 higher than the volatilization temperature range R11, by the firing device 230. As a result, as illustrated in FIG. 17B, the covering material 33 of the bonding agent 30 melts and volatilizes, so that the conductive material 31 and the first surface 181 are metallically bonded; the conductive material 31 and the second surface 191 are metallically bonded; and the particles of the conductive material 31 are bonded to each other (see FIG. 11). Consequently, the first distal end 61 and the second distal end 71 are electrically and mechanically bonded. The bonding agent 30 is reduced to the thickness t1 that is less than double the thickness t3.

Then, in all the slots 12, all the first surfaces 181 (first bonding surface 81) and second surfaces 191 (second bonding surface 91) facing each other are bonded. In this manner, the wave winding coil unit 20 is formed. After that, as illustrated in FIG. 2, the stator 100 is completed. Note that as illustrated in FIG. 1, the stator 100 and the rotor 101 are assembled, so that the rotary electric machine 102 is manufactured.

ADVANTAGEOUS EFFECTS OF THE EMBODIMENT

According to the above embodiment, the following advantageous effects can be obtained.

As described in the above embodiment, after the step (S4) of placing a bonding agent (30) on distal ends (61, 71), and before the step (S10) of bonding the distal ends (61, 71) to each other, the viscosity of the bonding agent (30) placed on the distal ends (61, 71) is increased (from µ1 to µ2). In this way, it is possible to place the bonding agent (30) with a relatively low viscosity (µ1) and high fluidity (for example, with an improved applicability) on the distal ends (61, 71) of the segment conductors (40). Further, since the viscosity of the bonding agent (30) is increased (from µ1 to µ2) after placing the bonding agent (30) on the distal ends (61, 71), it is less likely that the bonding agent (30) moves to other portions and flows out from between the distal ends (61, 71), before the distal ends (61, 71) are bonded to each other after increasing the viscosity of the bonding agent (30) (from µ1 to µ2). Therefore, it is possible to secure the amount of conductive material (31) of the bonding agent (30) remaining on the distal ends (61, 71). Accordingly, with an appropriate amount of bonding agent (30) (conductive material (31)), the bonding strength (fixing force) between the distal ends (61, 71) can be secured. As a result, the bonding quality can be secured when bonding the distal ends (61, 71) of the segment conductors (40) with the bonding agent (30).

Further, in the above embodiment, the step (S5) of increasing the viscosity of the bonding agent (30) (from μ1 to μ2) is a step (S5) of increasing the viscosity of the bonding agent (30) (from μ1 to μ2), by volatilizing at least a part of a volatile agent (32) contained in the bonding agent (30), after the step (S4) of placing the bonding agent (30) on the distal ends (61, 71). With this configuration, before the viscosity is increased (from μ1 to μ2), the bonding agent (30) contains the volatile agent (32) having a relatively low viscosity (μ11), and therefore the bonding agent (30) having a high fluidity can easily be placed on the distal ends (61, 71) of the segment conductors (40). In the case of a related-art stator, due to the movement of a bonding agent from the desired arrangement position or the flowing of the bonding agent out from between the distal ends, the amount of conductive particles in the binder remaining between the distal ends after the distal ends are bonded to each other may become less than the desired amount. Further, as the amount of conductive particles is reduced, the conductivity between legs may be reduced, and the bonding strength (fixing force) may be reduced. In contrast, with the configuration of the above embodiment, the viscosity of the bonding agent (30) can easily be increased (from μ1 to μ2) while preventing a reduction in the amount of conductive material (31), by volatilizing the volatile agent (32) having a relatively low viscosity (μ11) in the bonding agent (30). This makes it possible to prevent a reduction in bonding strength (fixing force) while preventing a reduction in conductivity between the distal ends (61, 71) due to a reduction in the amount of conductive material (31).

Further, in the above embodiment, the step (S5) of increasing the viscosity of the bonding agent (30) (from μ1 to μ2) is a step (S5) of increasing the viscosity of the bonding agent (30) (from μ1 to μ2), by volatilizing at least a part of the volatile agent (32) contained in the bonding agent (30) by heating the bonding agent (30). With this configuration, the volatile agent (32) contained in the bonding agent (30) can be actively volatilized compared to the case where the volatile agent (32) is volatilized at an ordinary temperature (T1), so that the viscosity of the bonding agent (30) can easily be increased (from μ1 to μ2).

Further, in the above embodiment, the step (S5) of increasing the viscosity of the bonding agent (30) (from μ1 to μ2) is a step (S5) of increasing the viscosity of the bonding agent (30) (from μ1 to μ2), by volatilizing at least a part of the volatile agent (32) contained in the bonding agent (30) by heating the bonding agent (30) to a temperature (T2) in a volatilization temperature range (R11) in which the volatile agent (32) volatilizes; and the step (S10) of bonding the distal ends (61, 71) to each other is a step (S10) of bonding the distal ends (61, 71) to each other by heating the bonding agent (30) to a temperature (T3) in a bonding temperature range (R12) higher than the volatilization temperature range (R11). With this configuration, the volatile agent (32) contained in the bonding agent (30) can easily be volatilized while preventing transformation of the bonding agent (30) into a bonded state (for example, transformation of the conductive material (31) into a metallically bonded state), by heating the bonding agent (30) to the temperature (T2) in the volatilization temperature range (R11). Then, when bonding the distal ends (61, 71) to each other, the distal ends (61, 71) can easily be bonded by metallic bonding of the conductive material (31) of the bonding agent (30), by increasing the temperature for heating the bonding agent (30) to the temperature (T3) in the bonding temperature range (R12).

Further, in the above embodiment, the bonding agent (30) contains the conductive material (31), the volatile agent (32), and a covering material (33) that covers at least a part of a periphery of the conductive material (31); the step (S5) of increasing the viscosity of the bonding agent (30) (from μ1 to μ2) is a step (S5) of increasing the viscosity of the bonding agent (30) (from μ1 to μ2), by volatilizing the volatile agent (32) contained in the bonding agent (30); and the step (S10) of bonding the distal ends (61, 71) to each other is a step (S10) of bonding the distal ends (61, 71) to each other with the conductive material (31) remaining between the distal ends (61, 71), by volatilizing the covering material (33) contained in the bonding agent (30). With this configuration, even after volatilizing the volatile agent (32) for increasing the viscosity (from μ1 to μ2), the covering material (33) covering at least a part of the periphery of the conductive material (31) can prevent chemical reaction (for example, oxidation, and metallic bonding) of the conductive material (31). Also, the distal ends (61, 71) are bonded to each other with the conductive material (31) remaining after the covering material (33) is volatilized. Therefore, unlike the case where all the covering material (33) remains in the bonding agent (30), the content ratio (concentration) of the conductive material (31) in the bonding agent (30) can be increased, so that the electrical bonding quality between the distal ends (61, 71) can be further increased.

Further, in the above embodiment, the step (S5) of increasing the viscosity of the bonding agent (30) (from μ1 to μ2) is a step (S5) of increasing the viscosity of the bonding agent (30) (μ1 to μ2), by heating the bonding agent (30). With this configuration, the properties of the bonding agent (30) can be chemically changed, so that the viscosity of the bonding agent (30) can easily be increased (from μ1 to μ2) by heating. For example, as in a modification described below other than the above embodiment, the viscosity of the bonding agent can be increased, by temporarily curing the bonding agent (curing only a part of the material of the bonding agent) by heating the bonding agent.

In the above embodiment, the step (S8) of placing the plurality of segment conductors (40) on the armature core (10) is a step (S8) of placing the plurality of segment conductors (40) on the armature core (10) such that the distal end (61, 71) of one segment conductor (40) and the distal end (61, 71) of another segment conductor (40) face each other in the central axis (C1) direction and such that a first surface (181) of the distal end (61, 71) of the one segment conductor (40) and a second surface (191) of the distal end (61, 71) of the other segment conductor (40) face each other in a radial direction of the armature core (10); and the step (S10) of bonding the distal ends (61, 71) to each other is a step (S10) of bonding the distal ends (61, 71) to each other, by heating the bonding agent (30) while pressing the first surface (181) and the second surface (191) against each other in the radial direction of the armature core (10). In the case of pressing the plurality of segment conductors (40) in the central axis (C1) direction, the coil end portions disposed on the outer side with respect to the armature core (10) in the central axis (C1) need to be pressed. In this case, the coil end portions (52) disposed away from the first surface (181) and the second surface (191) in the armature core (10) are pressed. Since the pressing positions are away from the bonding position, it is difficult to evenly apply the pressing force. In this regard, with the configuration of the above embodiment, the bonding agent (30) is heated while the first surface (181) and the second surface (191) are pressed against each other in the radial direction of the armature core (10), so that the portion (in-slot portions (60, 70)) in the vicinity of the first surface (181) and the second surface (191) can be pressed in the radial direction in the armature core (10), unlike the case where the coil end portions (52) disposed away therefrom are pressed. Therefore, it is possible to prevent the pressing force from being unevenly applied to the first surface (181) and the second surface (191). As a result, the bonding quality between the distal ends (61, 71) can be further improved.

Further, in the above embodiment, the step (S5) of increasing the viscosity of the bonding agent (30) (from μ1 to μ2) is a step (S5) of increasing the viscosity of the bonding agent (30) (from μ1 to μ2), before the step (S8) of placing the plurality of segment conductors (40) on the armature core (10). With this configuration, since the bonding agent (30) has an increased viscosity (μ2) at the time of placing the plurality of segment conductors (40) on the armature core (10), it is possible to prevent the bonding agent (30) from moving from the distal ends (61, 71) to other portions, or prevent the bonding agent (30) from dripping from the distal ends (61, 71) when placing the plurality of segment conductors (40) on the armature core (10).

Further, in the above embodiment, the step (S6) of forming coil assemblies (20a, 20b) by arranging the plurality of segment conductors (40) with the bonding agent (30) applied thereto in an annular shape is further included, before the step (S8) of placing the plurality of segment conductors (40) on the armature core (10). In the embodiment, the step (S5) of increasing the viscosity of the bonding agent (30) (from μ1 to μ2) is a step (S5) of increasing the viscosity of the bonding agent (30) (from μ1 to μ2), before the step (S6) of forming the coil assemblies (20a, 20b); and the step (S8) of placing the plurality of segment conductors (40) on the armature core (10) is a step (S8) of placing the plurality of segment conductors (40) on the armature core (10), by placing the coil assemblies (20a, 20b) on the armature core (10). With this configuration, since the bonding agent (30) has an increased viscosity (μ2) at the time of forming the coil assemblies (20a, 20b), it is possible to prevent the bonding agent (30) from moving from the distal ends (61, 71) to other portions, or prevent the bonding agent (30) from dripping from the distal ends (61, 71) when forming the coil assemblies (20a, 20b).

Further, in the above embodiment, the step (S4) of placing the bonding agent (30) is a step of applying the bonding agent (30) to at least either one of the distal end (61, 71) of the one segment conductor (40) and the distal end (61, 71) of the other segment conductor (40). With this configuration, by applying the bonding agent (30), the bonding agent (30) that is prior to the increase in viscosity (from μ1 to μ2) and has a relatively low viscosity (μ1) and high applicability (fluidity) can easily be placed on the distal end (61, 71) of the segment conductor (40).

[Modifications]

A preferred embodiment of the preferred embodiment has been disclosed and described herein for purposes of illustration and not for purposes of limitation. The scope of the invention is indicated by the appended claims rather than the foregoing description of the embodiment, and all variations (modifications) which come within the meaning and range of equivalents thereof are intended to be embraced therein.

<First Modification>

Figure 20A:
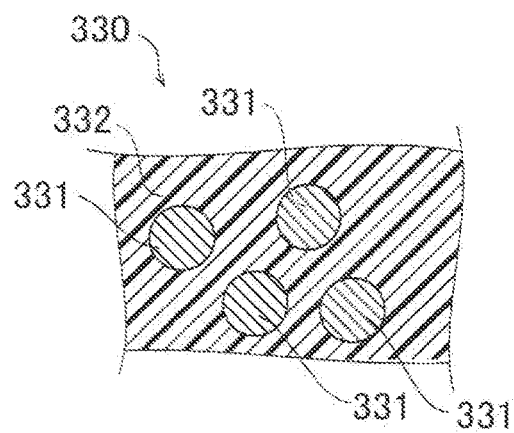
FIG. 20A illustrates the state before the viscosity of the bonding agent is increased.
Figure 20B:
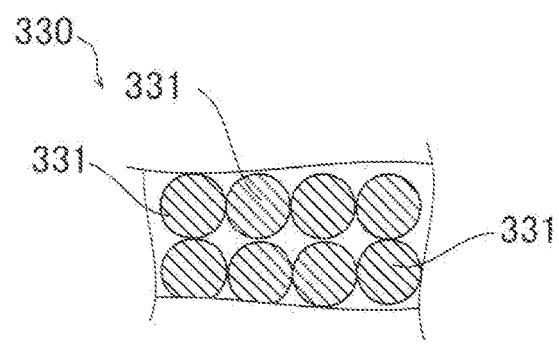
FIG. 20B illustrates the state after the viscosity of the bonding agent is increased.

For example, in the above embodiment, the bonding agent contains the covering material. However, the preferred embodiment is not limited thereto. For example, according to a bonding agent 330 of a first modification illustrated in FIG. 20A, the bonding agent 330 does not contain a covering material, and may contain only a conductive material 331 and a volatile agent 332. In this case, in the step of increasing the viscosity of the bonding agent 330, the viscosity may be increased by volatilizing a part of the volatile agent 332. Then, as shown in FIG. 20B, in the step of bonding the first distal end and the second distal end, all the volatile agent 332 may be volatilized, and the first distal end and the second distal end may be bonded with the remaining conductive material 331.

<Second Modification>

Figure 21A:
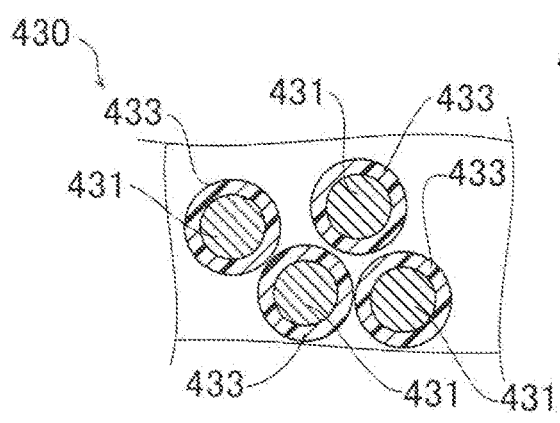
FIG. 21A illustrates the state before a covering material is melted.
Figure 21B:
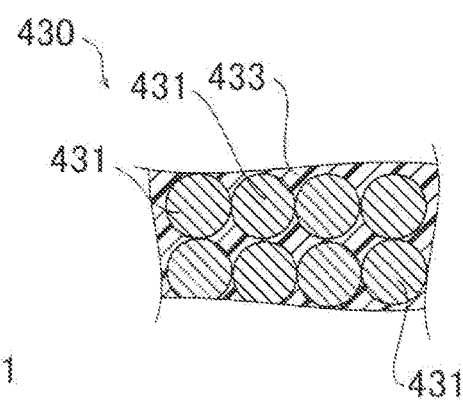
FIG. 21B illustrates a thermally cured state after the covering material is melted.

Further, in the above embodiment, substantially all the covering material is volatilized in the step of bonding the first distal end and the second distal end. However, the preferred embodiment is not limited thereto. For example, as in a bonding agent 430 of a second modification illustrated in FIGS. 21A and 21B, a covering material 433 may be a thermosetting resin. Thus, in the step of bonding the first distal end and the second distal end, the covering material 433 melts and moves such that the particles of a conductive material 431 metallically bond to each other, and the first distal end and the second distal end may be bonded while both the conductive material 431 and the covering material 433 cured by heat are remaining.

<Third Modification>

Figure 22:
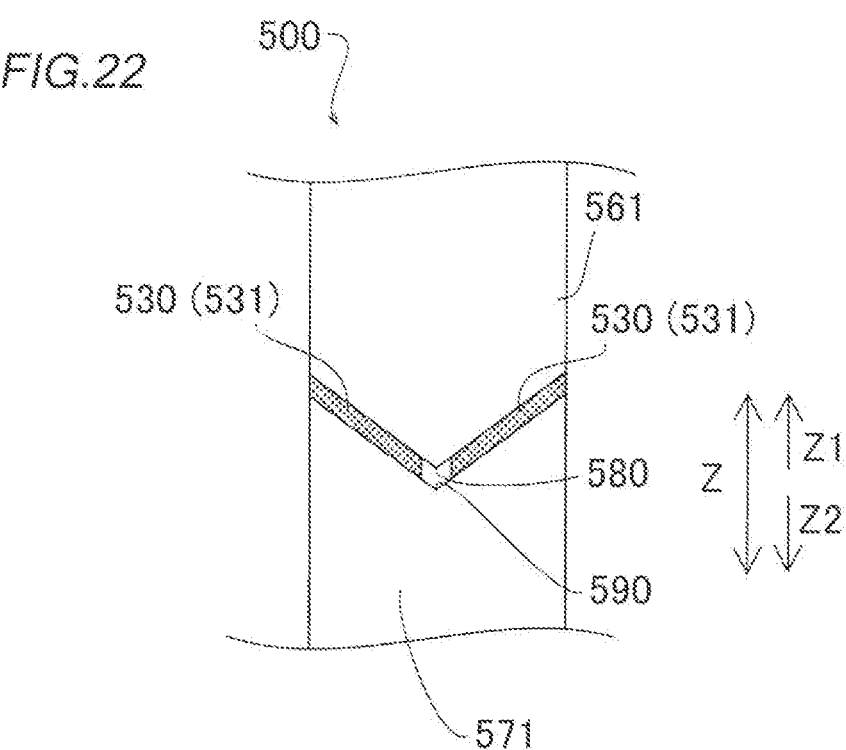
FIG. 22 illustrates the configuration of a stator according to a third modification.

Further, in the above embodiment, the first bonding surface and the second bonding surface are pressed in the radial direction. However, the preferred embodiment is not limited thereto. For example, as in a stator 500 of a third modification illustrated in FIG. 22, a projection 580 of a first distal end 561 may be formed to project to one axial side (arrow Z2 direction side), and a recess 590 of a second distal end 571 may be formed to be recessed to the one axial side (arrow Z2 direction side). In this case, the first distal end 561 and the second distal end 571 are pressed against each other in the axial direction, so that a first bonding surface 581 and a second bonding surface 591 are pressed against each other in the axial direction so as to be bonded with a conductive material 531 of a bonding agent 530.

<Fourth Modification>

Figure 23:
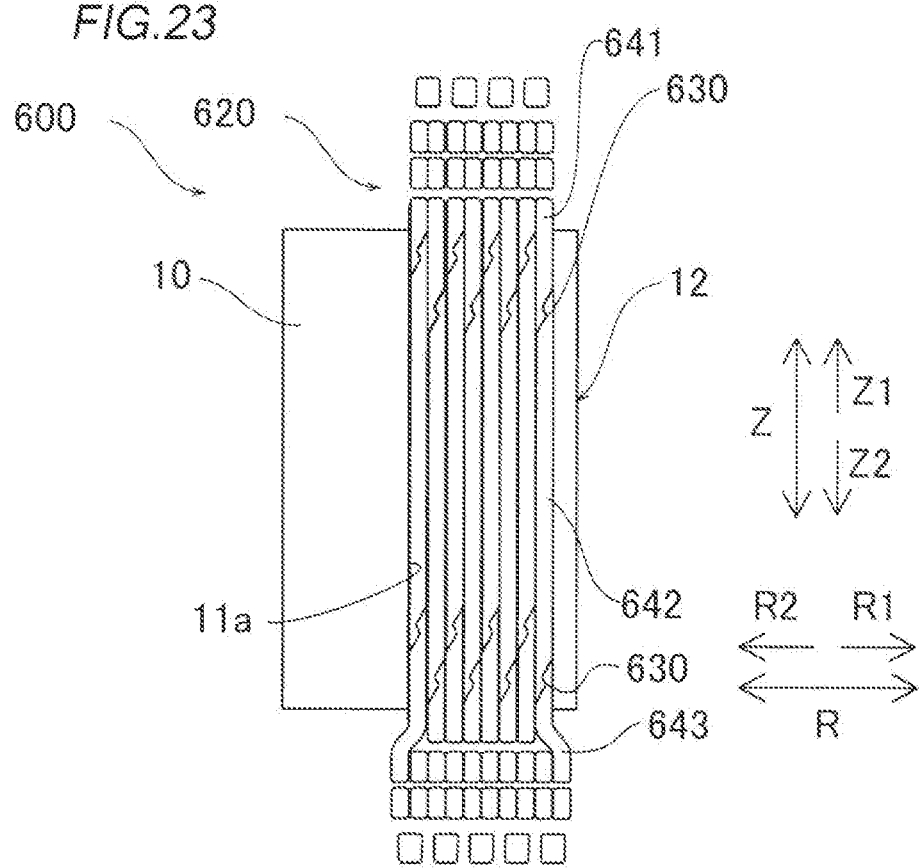
FIG. 23 illustrates the configuration of a stator according to a fourth modification.

Further, in the above embodiment, two segment conductors are bonded in the axial direction in the slot. However, the preferred embodiment is not limited thereto. For example, as in a coil unit 620 of a stator 600 of a fourth modification illustrated n FIG. 23, three segment conductors 641, 642, and 643 may be bonded, in this order, with a bonding agent 630 in the axial direction in each slot 12.

<Other Modifications>

Further, in the above embodiment, the armature of the preferred embodiment is configured as a stator. However, the preferred embodiment is not limited thereto. For example, the armature of the preferred embodiment may be configured as a rotor including a rotor core and coils (segment conductors).

Further, in the above embodiment, the opening is formed at the radially inner side of the stator. However, the preferred embodiment is not limited thereto. For example, the opening may be formed at the radially outer side of the stator.

Further, in the above embodiment, the coil is formed as a wave winding coil. However, the preferred embodiment is not limited thereto. For example, the coil may be formed as a distributed winding coil or a concentrated winding coil.

Further, in the above embodiment, the transverse cross-sectional shape of the segment conductor is rectangular. However, the preferred embodiment is not limited thereto. That is, the transverse cross-sectional shape of the segment conductor may be a shape other than rectangular (such as a circular shape and an oval shape).

Further, in the above embodiment, the slot is configured as a semi-open slot (having an opening width less than the slot width). However, the preferred embodiment is not limited thereto. For example, the slot may be configured as a full-open slot having an opening width equal to the slot width as long as it does not significantly affect the properties of the stator (armature). Still, in terms of the properties of the stator, the semi-open type is more preferable than the full-open type.

Further, in the above embodiment, in the step of applying the bonding agent, the bonding agent is applied to both the first bonding surface and the second bonding surface. However, the preferred embodiment is not limited thereto. For example, the bonding agent may be applied to only either one of the first bonding surface and the second bonding surface.

Further, in the above embodiment, the step of increasing the viscosity of the bonding agent is performed before the step of forming the first coil assembly and the second coil assembly. However, the preferred embodiment is not limited thereto. That is, the step of increasing the viscosity of the bonding agent may be performed after the step of forming the first coil assembly and the second coil assembly.

Further, in the above embodiment, the step of increasing the viscosity of the bonding agent is performed before the step of placing the plurality of segment conductors in the slots. However, the preferred embodiment is not limited thereto. That is, if the viscosity of the bonding agent is increased before the projection of the first distal end and the recess of the second distal end engage with each other, the step of increasing the viscosity of the bonding agent may be performed during the step of placing the plurality of segment conductors in the slots.

Further, in the above embodiment, in the step of increasing the viscosity of the bonding agent, substantially all the volatile agent in the bonding agent is volatilized. However, the preferred embodiment is not limited thereto. That is, as in the first modification, in the step of increasing the viscosity of the bonding agent, the viscosity of the bonding agent may be increased by volatilizing only a part of the volatile agent in the bonding agent.

Further, in the above embodiment, the step of increasing the viscosity of the bonding agent is performed by volatilizing the volatile agent in the bonding agent. However, the preferred embodiment is not limited thereto. That is, the step of increasing the viscosity of the bonding agent may be performed by curing a part of the bonding agent without volatilizing the volatile agent in the bonding agent.

Further, in the above embodiment, the step of increasing the viscosity of the bonding agent is performed by volatilizing the volatile by heating the bonding agent. However, the preferred embodiment is not limited thereto. That is, the step of increasing the viscosity of the bonding agent may be performed by volatilizing the volatile agent at the ordinary temperature without heating the bonding agent.

Further, in the above embodiment, the bonding agent is heated to a temperature higher than or equal to 100° C. and lower than or equal to 130° C. in the step of increasing the viscosity of the bonding agent, and the bonding agent is heated to a temperature higher than or equal to 250° C. and lower than or equal to 300° C. in the step of bonding the first distal end and the second distal end. However, the preferred embodiment is not limited thereto. That is, the bonding agent may be heated to a temperature out of the range higher than or equal to 100° C. and lower than or equal to 130° C. in the step of increasing the viscosity of the bonding agent, and the bonding agent may be heated to a temperature outside the range higher than or equal to 250° C. and lower than or equal to 300° C. in the step of bonding the first distal end and the second distal end.

Further, in the above embodiment, the in-slot portion is provided with the insulating member. However, the preferred embodiment is not limited thereto. For example, in the case where the insulating film of the segment conductor has a sufficient thickness, no insulating member has to be disposed on the in-slot portion.

Further, in the above embodiment, the step of bonding the first distal end and the second distal end is performed in the atmosphere of inert gas. However, the preferred embodiment is not limited thereto. That is, if oxidation can be sufficiently prevented by the covering material and the like, or if some oxidation of the conductive material is allowable, the step of bonding the first distal end and the second distal end may be performed in air (atmospheric gas).

Further, in the above embodiment, the bonding agent contains the volatile agent, and the viscosity of the bonding agent is increased by volatilizing the volatile agent in the bonding agent. However, the preferred embodiment is not limited thereto. The bonding agent may be, for example, a conductive boding agent containing two types of thermosetting resins with different curing temperatures. In this case, the bonding agent is temporarily cured by heating the bonding agent to a temperature at which one of the thermosetting resins is cured. Then, after placing the segment conductors on the armature core (for example, in the slots), the distal ends of the plurality of segment conductors may be bonded by heating the bonding agent to a temperature at which the other thermosetting resin is cured.

Further, in the above embodiment, the distal ends of the plurality of segment conductors are bonded in the slot. However, the preferred embodiment is not limited thereto. That is, the distal ends of the legs of the plurality of segment conductors may be bonded outside the slot (in the position on the axially outer side of the slot). In this case, the legs (the portions of the segment conductors extending in the axial direction) may or may not be disposed in the slot. Accordingly, the coil end portion is a portion where paired legs are bonded.

DESCRIPTION OF THE REFERENCE NUMERALS 10 stator core (armature core)
12 slot
20, 620 coil unit
20a first coil assembly (coil assembly)
20b second coil assembly (coil assembly)
30, 330, 430, 530, 630 bonding agent
31, 331, 431, 531 conductive material
32, 332 volatile agent
33, 433 covering material
40, 641, 642, 643 segment conductor
61, 561 first distal end (distal end)
71, 571 second distal end (distal end)
100, 500, 600 stator (armature)
181 first surface (bonding surface)
191 second surface (bonding surface)
R11 volatilization temperature range
R12 bonding temperature range
$\mu_1$, $\mu_2$ viscosity of bonding agent

The invention claimed is:

1. A method of manufacturing an armature that includes an armature core having a plurality of slots extending in a central axis direction, and a coil unit in which distal ends of a plurality of segment conductors disposed to face each other in the central axis direction are bonded with a bonding agent containing a conductive material, the method comprising:

a step of placing the bonding agent on bonding surfaces of the distal ends of the plurality of segment conductors;

a step of increasing a viscosity of the bonding agent placed on the distal ends after the step of placing the bonding agent;

a step of placing the plurality of segment conductors on the armature core after the step of increasing the viscosity of the bonding agent such that the bonding surface of the distal end of one segment conductor of the plurality of segment conductors and the bonding surface of the distal end of another segment conductor of the plurality of segment conductors face each other; and a step of bonding the distal ends to each other with the conductive material of the bonding agent after the step of placing the plurality of segment conductors on the armature core.

2. The method of manufacturing an armature according to claim 1, wherein the step of increasing the viscosity of the bonding agent is a step of increasing the viscosity of the bonding agent, by volatilizing at least a part of a volatile agent contained in the bonding agent.

3. The method of manufacturing an armature according to claim 2, wherein the step of increasing the viscosity of the bonding agent is a step of increasing the viscosity of the bonding agent, by volatilizing at least a part of the volatile agent contained in the bonding agent by heating the bonding agent.

4. The method of manufacturing an armature according to claim 3, wherein:

the step of increasing the viscosity of the bonding agent is a step of increasing the viscosity of the bonding agent, by volatilizing at least a part of the volatile agent contained in the bonding agent by heating the bonding agent to a temperature in a volatilization temperature range in which the volatile agent volatilizes; and the step of bonding the distal ends to each other is a step of bonding the distal ends to each other by heating the bonding agent to a temperature in a bonding temperature range higher than the volatilization temperature range.

5. The method of manufacturing an armature according to claim 3, wherein:

the step of placing the plurality of segment conductors on the armature core is a step of placing the plurality of segment conductors on the armature core such that the distal end of the one segment conductor and the distal end of the other segment conductor face each other in the central axis direction and such that a first surface of the distal end of the one segment conductor and a second surface of the distal end of the other segment conductor face each other in a radial direction of the armature core; and the step of bonding the distal ends to each other is a step of bonding the distal ends to each other, by heating the bonding agent while pressing the first surface and the second surface against each other in the radial direction of the armature core.

6. The method of manufacturing an armature according to claim 2, wherein:

the bonding agent contains the conductive material, the volatile agent, and a covering material that covers at least a part of a periphery of the conductive material;

the step of increasing the viscosity of the bonding agent is a step of increasing the viscosity of the bonding agent, by volatilizing the volatile agent contained in the bonding agent; and the step of bonding the distal ends to each other is a step of bonding the distal ends to each other with the conductive material remaining between the distal ends, by volatilizing the covering material contained in the bonding agent.

7. The method of manufacturing an armature according to claim 1, wherein the step of increasing the viscosity of the bonding agent is a step of increasing the viscosity of the bonding agent, by heating the bonding agent.

8. The method of manufacturing an armature according to claim 1, wherein the step of increasing the viscosity of the bonding agent is a step of increasing the viscosity of the bonding agent.

9. The method of manufacturing an armature according to claim 8, further comprising:

a step of forming coil assemblies by arranging the plurality of segment conductors with the bonding agent placed on the segment conductors in an annular shape, before the step of placing the plurality of segment conductors on the armature core; wherein:

the step of increasing the viscosity of the bonding agent is a step of increasing the viscosity of the bonding agent, before the step of forming the coil assemblies; and the step of placing the plurality of segment conductors on the armature core is a step of placing the plurality of segment conductors on the armature core, by placing the coil assemblies on the armature core.

10. The method of manufacturing an armature according to claim 1, wherein the step of placing the bonding agent is a step of applying the bonding agent to at least either one of the bonding surface of the distal end of the one segment conductor and the bonding surface of the distal end of the other segment conductor.

* * * * *